United States Patent
Hwang et al.

(10) Patent No.: US 9,590,673 B2
(45) Date of Patent: Mar. 7, 2017

(54) SWITCHED, SIMULTANEOUS AND CASCADED INTERFERENCE CANCELLATION

(71) Applicant: QUALCOMM Incorporated, San Diego, CA (US)

(72) Inventors: Insoo Hwang, San Diego, CA (US); Bongyong Song, San Diego, CA (US); Cong Nguyen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/601,038

(22) Filed: Jan. 20, 2015

(65) Prior Publication Data

US 2016/0211882 A1    Jul. 21, 2016

(51) Int. Cl.
  *H04B 1/12*   (2006.01)
  *H04B 1/403*  (2015.01)
  *H04B 1/525*  (2015.01)

(52) U.S. Cl.
  CPC .............. *H04B 1/126* (2013.01); *H04B 1/406* (2013.01); *H04B 1/525* (2013.01)

(58) Field of Classification Search
  CPC .......... H04B 1/48; H04B 1/126; H04B 1/406; H04B 1/525
  USPC ......................................................... 455/79
  See application file for complete search history.

(56) References Cited

U.S. PATENT DOCUMENTS

| | | | | |
|---|---|---|---|---|
| 4,912,387 A | * | 3/1990 | Moulds, III | ........ F16C 32/0444 310/90.5 |
| 5,010,576 A | * | 4/1991 | Hill | ..................... G10K 11/1784 381/71.14 |
| 5,265,042 A | * | 11/1993 | Smith, Jr. | .......... H03H 17/0261 708/301 |
| 5,499,301 A | * | 3/1996 | Sudo | ................... G10K 11/1784 381/71.14 |

(Continued)

FOREIGN PATENT DOCUMENTS

WO    WO-2011082484 A1    7/2011

OTHER PUBLICATIONS

Partial International Search Report—PCT/US2016/013106—ISA/EPO—Apr. 25, 2016.

(Continued)

*Primary Examiner* — Hai V Nguyen
(74) *Attorney, Agent, or Firm* — Loza & Loza LLP

(57) ABSTRACT

Aspects of the disclosure are directed to interference cancellation and wireless communication. A method of performing analog interference cancellation in a wireless communications device having a transmitter and a receiver includes receiving a reference signal representative of an interfering signal transmitted by the transmitter, selecting a first target interference type from one of a plurality of interference types affecting a an RF signal received by the receiver, configuring a first filter of an interference cancellation circuit using a coefficient computed based on the first target interference type, and cancelling interference in the RF signal using an output of the first filter. Coefficient computation may be performed in a switched manner between analog and digital domain, simultaneously in multiple domains, or in a cascaded manner that provides digital interference cancellation.

29 Claims, 12 Drawing Sheets

(56) References Cited

U.S. PATENT DOCUMENTS

| | | | | |
|---|---|---|---|---|
| 5,646,962 | A * | 7/1997 | Harrison | A61B 6/56 332/103 |
| 5,758,275 | A * | 5/1998 | Cox | H04B 1/1036 455/306 |
| 5,872,540 | A * | 2/1999 | Casabona | G01S 1/045 342/362 |
| 5,970,093 | A * | 10/1999 | de Lantremange | 375/232 |
| 5,995,566 | A * | 11/1999 | Rickard | H04L 27/2647 375/346 |
| 6,009,448 | A * | 12/1999 | Jong | H03H 21/0012 708/322 |
| 6,014,412 | A * | 1/2000 | Wiese | H04B 1/123 329/318 |
| 6,470,047 | B1 * | 10/2002 | Kleinerman | H04L 25/03267 375/232 |
| 6,683,913 | B1 * | 1/2004 | Kantschuk | H04B 1/123 333/12 |
| 6,804,393 | B2 * | 10/2004 | Gindele | G06T 5/20 382/167 |
| 6,976,044 | B1 * | 12/2005 | Kilani | H04B 1/1036 708/320 |
| 6,985,099 | B1 * | 1/2006 | Luz | H03M 1/185 341/139 |
| 6,988,236 | B2 * | 1/2006 | Ptasinski | H04L 1/0003 370/252 |
| 7,068,102 | B2 * | 6/2006 | Hwang | H03F 1/26 330/149 |
| 7,072,633 | B2 * | 7/2006 | Gomez | H03D 7/161 455/260 |
| 7,106,871 | B1 * | 9/2006 | Nielsen | H04R 25/453 381/312 |
| 7,266,355 | B2 * | 9/2007 | Diloisy | H04B 7/0845 375/230 |
| 7,907,904 | B2 * | 3/2011 | Waltho | H04W 52/16 330/75 |
| 8,144,807 | B2 * | 3/2012 | Mirfakhraei | H04B 3/32 375/144 |
| 8,218,092 | B1 * | 7/2012 | Cohen | H04N 5/455 348/726 |
| 8,224,278 | B2 * | 7/2012 | Cairns | H04B 1/7115 375/346 |
| 8,391,822 | B2 * | 3/2013 | Lim | H04B 1/28 455/323 |
| 8,396,177 | B1 * | 3/2013 | Morris | H04B 7/002 375/229 |
| 8,442,099 | B1 * | 5/2013 | Sederat | H04B 3/30 375/219 |
| 8,521,090 | B2 * | 8/2013 | Kim | H04B 1/525 455/296 |
| 8,676,144 | B2 * | 3/2014 | Guo | H04B 7/0865 375/346 |
| 8,701,065 | B1 * | 4/2014 | Silver | H03H 9/465 333/133 |
| 8,755,756 | B1 * | 6/2014 | Zhang | H04B 1/109 455/114.2 |
| 8,792,597 | B2 * | 7/2014 | Malkin | H04B 3/30 370/285 |
| 8,792,598 | B1 * | 7/2014 | Cendrillon | H04B 1/109 375/346 |
| 8,798,654 | B2 * | 8/2014 | Rossel | H04B 7/0857 342/159 |
| 9,014,315 | B1 * | 4/2015 | Hogerheiden, Jr. | H04B 1/123 375/346 |
| 9,059,768 | B1 * | 6/2015 | Sorsby | H04B 1/1036 |
| 9,059,770 | B2 * | 6/2015 | Koifman | H04L 5/0023 |
| 9,065,508 | B2 * | 6/2015 | Baudin | H04B 1/0475 |
| 9,191,050 | B1 * | 11/2015 | Hwang | H04B 1/525 |
| 9,197,264 | B1 * | 11/2015 | Yoo | H04B 1/10 |
| 9,240,912 | B1 * | 1/2016 | Giridharan | H04L 25/03057 |
| 2002/0061752 | A1 * | 5/2002 | Kurokami | H04B 7/0885 455/447 |
| 2002/0137546 | A1 * | 9/2002 | Miya | H04B 1/7107 455/561 |
| 2002/0167994 | A1 * | 11/2002 | Takahashi | H04B 1/707 375/150 |
| 2003/0054788 | A1 * | 3/2003 | Sugar | H04B 1/0003 455/323 |
| 2003/0191634 | A1 * | 10/2003 | Thomas | G10L 19/04 704/219 |
| 2003/0203717 | A1 * | 10/2003 | Chuprun | G06K 13/0825 455/12.1 |
| 2004/0008764 | A1 * | 1/2004 | Seo | H04L 25/03343 375/229 |
| 2004/0106381 | A1 * | 6/2004 | Tiller | H04B 17/11 455/73 |
| 2004/0141548 | A1 * | 7/2004 | Shattil | H04L 1/04 375/146 |
| 2004/0146237 | A1 * | 7/2004 | Taylor | H01Q 1/525 385/14 |
| 2004/0213366 | A1 * | 10/2004 | Ono | H04B 1/1036 375/348 |
| 2004/0258262 | A1 * | 12/2004 | Jorgensen | H04R 25/453 381/322 |
| 2005/0026564 | A1 * | 2/2005 | Haub | H04B 1/109 455/67.11 |
| 2005/0053244 | A1 * | 3/2005 | Onishi | G10K 11/1786 381/71.11 |
| 2005/0069065 | A1 * | 3/2005 | Oh | H04B 17/309 375/350 |
| 2005/0147192 | A1 * | 7/2005 | Yamamoto | H04B 1/1036 375/345 |
| 2005/0195922 | A1 * | 9/2005 | Maeda | H04L 25/03254 375/341 |
| 2005/0245220 | A1 * | 11/2005 | Maeda | H04L 25/0328 455/203 |
| 2005/0254600 | A1 * | 11/2005 | Chen | H04L 27/0012 375/324 |
| 2006/0015331 | A1 * | 1/2006 | Hui | G10L 21/0272 704/227 |
| 2006/0166636 | A1 * | 7/2006 | Sato | H04B 1/18 455/284 |
| 2006/0234662 | A1 * | 10/2006 | Diloisy | H04B 7/0845 455/273 |
| 2007/0093224 | A1 * | 4/2007 | Lo | H04B 1/1027 455/251.1 |
| 2007/0184849 | A1 * | 8/2007 | Zheng | H04B 7/06 455/456.1 |
| 2008/0080644 | A1 * | 4/2008 | Batruni | H03H 21/0012 375/324 |
| 2008/0082281 | A1 * | 4/2008 | Batruni | H03F 1/3229 702/86 |
| 2008/0214137 | A1 * | 9/2008 | Qian | H03J 5/244 455/307 |
| 2008/0239771 | A1 * | 10/2008 | Wang | H02M 1/12 363/44 |
| 2008/0270082 | A1 * | 10/2008 | Batruni | G01R 31/31709 702/190 |
| 2009/0016263 | A1 * | 1/2009 | Kishigami | H04B 7/04 370/328 |
| 2009/0086864 | A1 * | 4/2009 | Komninakis | H04B 1/10 375/346 |
| 2009/0135972 | A1 * | 5/2009 | Tanaka | H04B 1/1027 375/346 |
| 2010/0039174 | A1 * | 2/2010 | Teetzel | H03F 1/3211 330/149 |
| 2010/0189162 | A1 * | 7/2010 | Yoshimoto | H03M 13/27 375/141 |
| 2010/0225389 | A1 * | 9/2010 | Teetzel | H03F 1/3211 330/149 |
| 2010/0283665 | A1 * | 11/2010 | Bashir | H04B 15/02 342/174 |
| 2010/0330946 | A1 * | 12/2010 | Akkarakaran | H01Q 1/246 455/273 |
| 2011/0014874 | A1 * | 1/2011 | Cairns | H04B 1/7115 455/63.1 |
| 2011/0059714 | A1 * | 3/2011 | Collins, III | H04B 1/109 455/296 |

(56) References Cited

U.S. PATENT DOCUMENTS

| | | | | |
|---|---|---|---|---|
| 2011/0116490 A1* | 5/2011 | Wilhelmsson | H04W 16/14 | 370/343 |
| 2011/0200089 A1* | 8/2011 | Umeda | H04B 7/0854 | 375/232 |
| 2011/0206100 A1* | 8/2011 | Kapoor | H04L 27/2601 | 375/221 |
| 2011/0211649 A1* | 9/2011 | Hahn | H04B 1/525 | 375/285 |
| 2011/0234315 A1* | 9/2011 | Chen | H03F 1/3229 | 330/149 |
| 2011/0262150 A1* | 10/2011 | Inoue | H04B 10/63 | 398/203 |
| 2012/0014416 A1* | 1/2012 | Dabiri | H03H 21/0012 | 375/144 |
| 2012/0176923 A1* | 7/2012 | Hsu | H04W 52/243 | 370/252 |
| 2012/0195207 A1* | 8/2012 | Mueck | H04W 24/10 | 370/252 |
| 2012/0195351 A1* | 8/2012 | Banwell | H04B 1/525 | 375/219 |
| 2012/0294459 A1* | 11/2012 | Chapman | G10H 3/186 | 381/98 |
| 2012/0295558 A1* | 11/2012 | Wang | H04B 1/109 | 455/79 |
| 2013/0080119 A1* | 3/2013 | Khait | A61B 5/7203 | 702/194 |
| 2013/0135048 A1* | 5/2013 | Hyun | H03F 3/45179 | 330/252 |
| 2013/0273834 A1* | 10/2013 | Sundstrom | H04B 7/155 | 455/7 |
| 2013/0309975 A1* | 11/2013 | Kpodzo | H04B 1/1027 | 455/63.1 |
| 2014/0073257 A1* | 3/2014 | Tujkovic | H04B 1/123 | 455/63.1 |
| 2014/0073258 A1* | 3/2014 | Burchill | H04B 1/123 | 455/63.1 |
| 2014/0170991 A1* | 6/2014 | Song | H04B 1/38 | 455/73 |
| 2014/0273906 A1* | 9/2014 | Feygin | H04L 1/20 | 455/296 |
| 2014/0341387 A1* | 11/2014 | Gauger, Jr. | H04R 3/002 | 381/71.6 |
| 2014/0348018 A1* | 11/2014 | Bharadia | H04L 5/1461 | 370/252 |
| 2015/0011236 A1* | 1/2015 | Kazmi | H04W 52/365 | 455/456.1 |
| 2015/0063509 A1* | 3/2015 | Hedayati | H04B 15/005 | 375/350 |
| 2015/0100221 A1* | 4/2015 | Routledge | F02D 17/02 | 701/111 |
| 2015/0234072 A1* | 8/2015 | McConnell | G01V 1/159 | 367/156 |
| 2015/0244431 A1* | 8/2015 | Vosburgh | H04B 7/04 | 375/347 |
| 2015/0271824 A1* | 9/2015 | Zhang | H04W 72/0453 | 370/329 |
| 2015/0311928 A1* | 10/2015 | Chen | H04B 1/525 | 375/350 |
| 2015/0346862 A1* | 12/2015 | Schwartz | G06F 3/0418 | 345/174 |
| 2016/0050031 A1* | 2/2016 | Hwang | H04B 1/525 | 375/219 |
| 2016/0141991 A1* | 5/2016 | Khalili Nia | H02J 3/24 | 322/19 |
| 2016/0196819 A1* | 7/2016 | Wurtz | G10K 11/1786 | 381/94.3 |

OTHER PUBLICATIONS

International Search Report and Written Opinion—PCT/US2016/013106—ISA/EPO—Aug. 9, 2016.

* cited by examiner

SWITCHED, SIMULTANEOUS AND CASCADED INTERFERENCE CANCELLATION

TECHNICAL FIELD

This disclosure relates generally to the field of interference cancellation systems and methods, and, in particular, to a cancellation of interference produced by multiple radios operating on the same, adjacent, harmonic, or intermodulation product frequencies.

BACKGROUND

Advanced wireless devices may have multiple radios that operate on the same, adjacent, or harmonic frequencies. The radios may provide access to networks such as wireless wide area network (WWAN), a wireless local area network (WLAN), a wireless personal area network (WPAN), Global Positioning System (GPS), Global Navigation Satellite System (GLONASS), etc. Some combinations of radios can cause co-existence issues due to interference between respective frequencies. In particular, when one radio is actively transmitting at or close to the same frequency and at a same time that another radio is receiving, the transmitting radio can cause interference to (i.e., de-sense) the receiving radio. For example, same-band interference may occur between Bluetooth (WPAN) and 2.4 GHz WiFi (WLAN); adjacent band interference between WLAN and Long Term Evolution (LTE) band 7, 40, 41; harmonic interference may occur between 5.7 GHz ISM and 1.9 GHz Personal Communications Service (PCS); and an intermodulation issue may occur between 7xx MHz and a GPS receiver.

Active interference cancellation (AIC) cancels interference between a transmitter radio and a receiver radio by matching gain and phase of a wireless coupling path signal and in a wired AIC path, as shown in FIG. 1, where $d_t$ is a transmitted signal from a transmitter (aggressor) radio 102, and $h_c$ is a coupling channel (wireless coupling path signal) from the transmitter radio 102 to a receiver (victim) radio 104. AIC 106 attempts to cancel the impact of the coupling channel $h_c$ as reflected via the negative sign on the output of AIC 106.

AIC may be implemented with respect to RF (radio frequency), baseband, or both RF/baseband. AIC in baseband typically only shows limited cancellation performance because the coupling path signal is much stronger than the desired signal strength, easily resulting in the saturation of an LNA (low-noise amplifier) and an ADC (analog-to-digital converter). AIC in RF can provide better cancellation performance. Prior art RF AIC techniques include difference calibration methods, such as direct channel estimation and cancellation method, binary search the coupling phase, and LMS (least mean squares)-based adaptive filtering methods.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

According to various aspects of the disclosure a method of performing interference cancellation in a wireless communications device having a transmitter and a receiver includes receiving a reference signal representative of an interfering signal transmitted by the transmitter, selecting a first target interference type from one of a plurality of interference types affecting a an RF signal received by the receiver, configuring a first filter of an interference cancellation circuit using a coefficient computed based on the first target interference type, and cancelling interference in the RF signal using an output of the first filter.

In one aspect, selecting the first target interference type includes determining whether interference at a fundamental frequency of the RF signal exceeds a threshold level, selecting fundamental frequency interference as the target interference when the fundamental frequency of the RF signal exceeds the threshold level, and selecting out of band interference as the target interference when the fundamental frequency of the RF signal does not exceed the threshold level.

In one aspect, the first target interference type includes interference at a fundamental frequency of the RF signal and the coefficient may be computed in the analog domain.

In one aspect, the first target interference type includes out of band interference, and the coefficient may be computed in the digital domain. The coefficient may be computed in the digital domain by computing the coefficient from a baseband representation of the received RF signal. The coefficient may be converted to an analog coefficient, and the analog coefficient may be applied to the interference cancellation circuit to cancel the interference in the RF signal.

In one aspect, the first target interference type includes interference at a fundamental frequency of the RF signal. The method may include providing the first filter an analog feedback signal representative of the RF signal. The output of the first filter may be generated using the analog feedback signal.

In one aspect, the first filter includes a least-mean squares filter.

In one aspect, the first filter may be configured by closing one or more switches based on the first target interference type. Each of the one or more switches may control the provision of a respective type of feedback to the first filter.

In one aspect, the first filter may be configured by providing the first filter a baseband feedback signal generated from the coefficient.

In one aspect, the method includes selecting a second target interference type from one of a plurality of interference types affecting the RF signal received by the receiver, configuring a second filter of the interference cancellation circuit using a coefficient computed based on the second target interference type, and cancelling interference in the RF signal using an output of the second filter while cancelling interference in the RF signal using the output of the first filter.

In one aspect, the method includes receiving a baseband transmission signal from the transmitter. The transmitter may be adapted to transmit an RF version of the baseband transmission signal, and cancelling interference in a baseband representation of the received RF signal using the baseband transmission signal. The baseband transmission signal may include a digital signal.

In various aspects, a wireless communications device includes one or more transceivers including a transmitter circuit and a receiver circuit, means for receiving a reference signal representative of an interfering signal transmitted by the transmitter circuit, means for selecting a first target interference type from one of a plurality of interference types affecting a radio frequency (RF) signal received by the receiver circuit, means for configuring a first filter of an interference cancellation circuit using a coefficient computed based on the first target interference type, and means for cancelling interference in the RF signal using an output of the first filter.

In various aspects, a computer readable storage medium has instructions stored thereon. The storage medium may include transitory and/or non-transitory storage devices. The instructions may be executable by at least one processor. When executed the instructions may cause the at least one processor to receive a reference signal representative of an interfering signal transmitted by the transmitter, select a first target interference type from one of a plurality of interference types affecting an RF signal received by the receiver, configure a first filter of an interference cancellation circuit using a coefficient computed based on the first target interference type, and cancel interference in the RF signal using an output of the first filter.

In various aspects, an interference cancellation apparatus includes means for receiving a reference signal representative of an interfering signal transmitted by the transmitter, means for selecting a first target interference type from one of a plurality of interference types affecting a an RF signal received by the receiver, means for configuring a first filter of an interference cancellation circuit using a coefficient computed based on the first target interference type, and means for cancelling interference in the RF signal using an output of the first filter.

DETAILED DESCRIPTION

Figure 1:
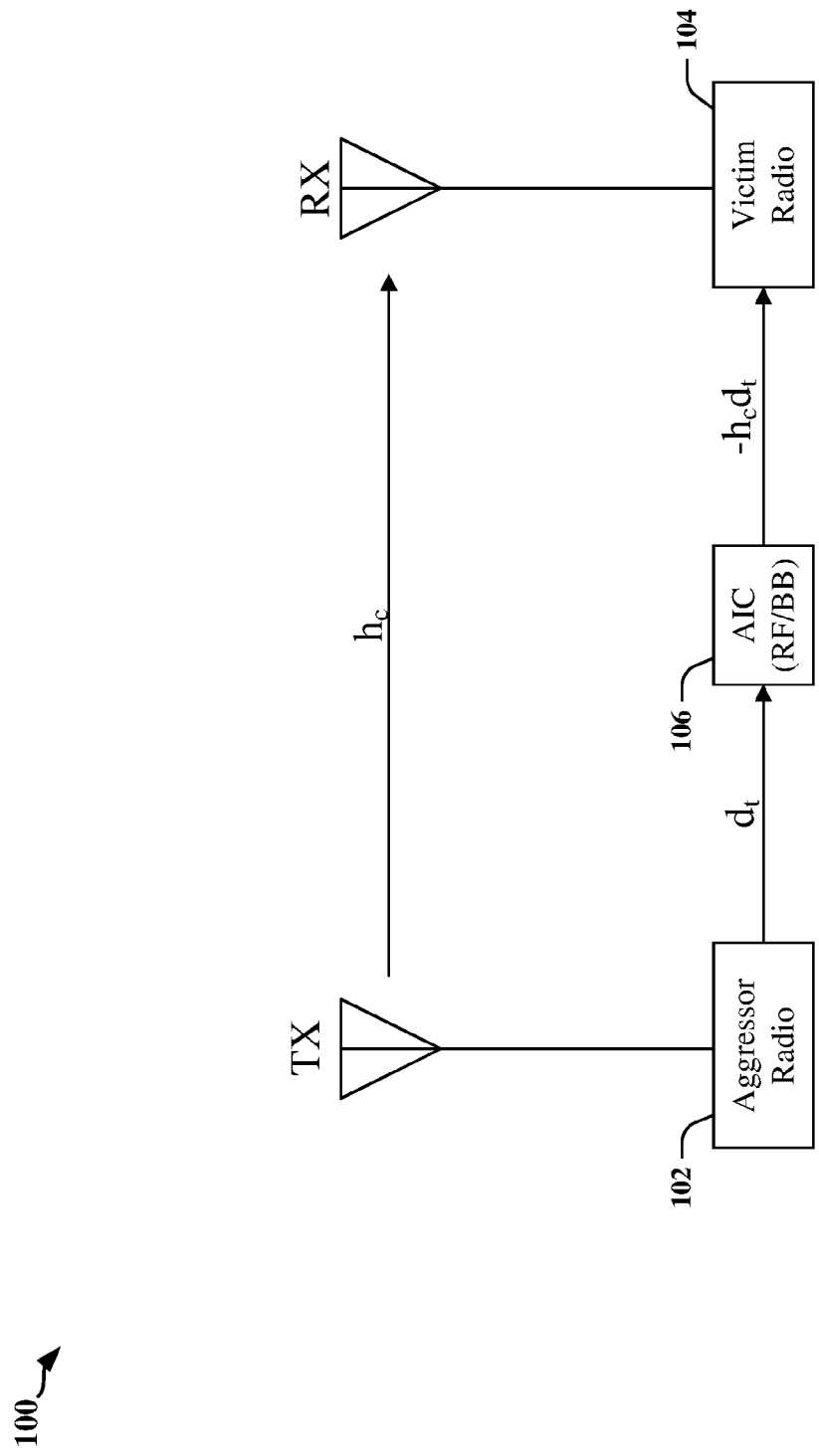
FIG. 1 is a block diagram of an active interference cancellation system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Various aspects of the disclosure relate to systems and methods for cancelling in-device interference resulting from transmissions by one radio (transceiver) that affect the receiving performance of a second radio (transceiver) operating on the same or adjacent, harmonic frequencies, or intermodulation product frequencies. In particular aspects, an interference cancellation system is adaptable for different radio combinations. For instance, for a co-existence issue caused by a first combination of radios, a transmitting radio (e.g., WiFi) may be selected for an input of an interference cancellation (IC) circuit and a receiving radio (e.g., Bluetooth) may be selected for the output of the interference cancellation circuit. For a co-existence issue caused by a second (different) combination of radios, the transmitting radio (e.g., WiFi) may be selected for the input of the interference cancellation circuit and the receiving radio (e.g., LTE band 7) may be selected for the output of the interference cancellation circuit. It should be noted that the terms cancellation (as in interference cancellation) and variants thereof may be synonymous with reduction, mitigation, and/or the like in that at least some interference is reduced.

Interference cancellation circuits may use an analog one-tap least mean squares (LMS) adaptive filter configured to match the signal in the interference cancellation path with the signal in the coupling path. An LMS adaptive filter may operate such that it mimics a desired filter using filter coefficients calculated to produce the least mean squares of an error signal, which may represent the difference between a desired signal and an observed or received signal. A conventional one-tap LMS interference cancellation filter ideally focuses its peak cancellation energy at the frequency where the power of an interfering signal is at its highest, and can typically address one type of interference and/or interference affecting one frequency or band of frequencies. A DC offset may be applied to the LMS filter to actively steer the cancellation center, with the value of the DC offset being automatically calculated in the digital domain in accordance with a baseband signal derived from the receiver. The DC offset may be generated using LMS filter coefficients calculated in the digital domain in accordance with the baseband signal.

In accordance with certain aspects of the present disclosure, one or more LMS circuits may be adaptively configured to cancel different types of interference using active interference cancellation.

Figure 2:
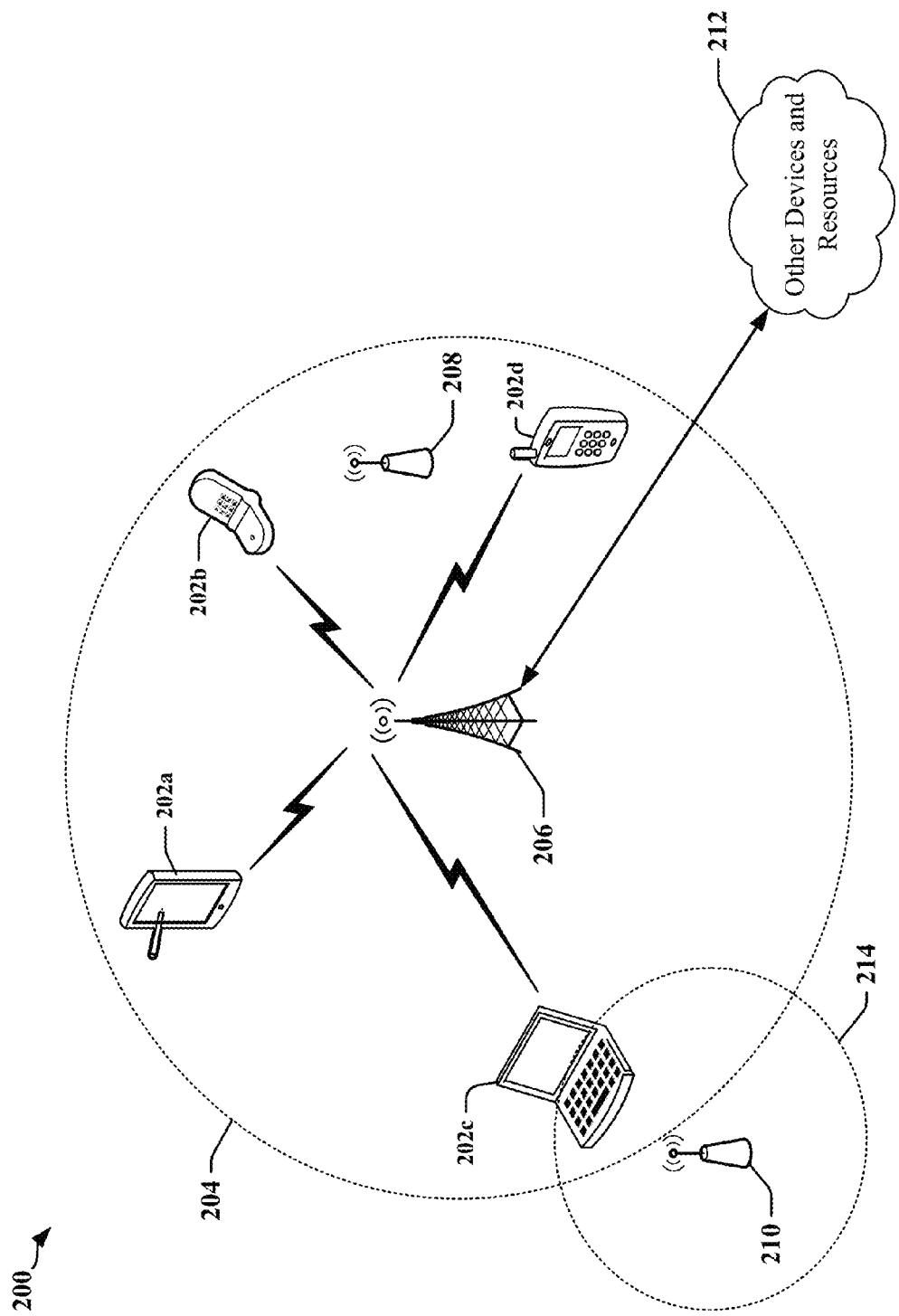
FIG. 2 is a diagram illustrating a networking environment that includes one or more wireless communication devices.

FIG. 2 is a diagram illustrating a networking environment 200 that includes one or more wireless communication devices 202a-202d. Each wireless communication device 202a-202d may be adapted or configured to transmit and/or receive wireless signals to/from at least one access point 206, 208, 210. In instances, the wireless communication device 202a-202d may be adapted or configured to transmit and/or receive wireless signals to/from at least one other wireless communication device 202a-202d. The one or more wireless communication devices 202a-202d may include a mobile device and/or a device that, while movable, is primarily intended to remain stationary. In one example, the device may be a cellular phone, a smart phone, a personal digital assistant, a portable computing device, a wearable computing device, and appliance, a media player, a navigation device, a tablet, etc. The one or more wireless communication devices 202a-202d may also include a stationary device (e.g., a desktop computer, machine-type communication device, etc.) enabled to transmit and/or receive wireless signals. The one or more wireless communication devices 202a-202d may include an apparatus or system embodied in or constructed from one or more integrated circuits, circuit boards, and/or the like that may be operatively enabled for use in another device. Thus, as used herein, the terms "device" and "mobile device" may be used interchangeably as each term is intended to refer to any single device or any combinable group of devices that may transmit and/or receive wireless signals.

One or more of the access points 206, 208, 210 may be associated with a radio access network (RAN) 204, 214 that provides connectivity using a radio access technology (RAT). The RAN 204, 214 may connect the one or more wireless communication devices 202a-202d to a core network. In various examples, the RAN 204, 214 may include a WWAN, a WLAN, a WPAN, a wireless metropolitan area network (WMAN), a Bluetooth communication system, a WiFi communication system, a Global System for Mobile communication (GSM) system, an Evolution Data Only/Evolution Data Optimized (EVDO) communication system, an Ultra Mobile Broadband (UMB) communication system, an LTE communication system, a Mobile Satellite Service-Ancillary Terrestrial Component (MSS-ATC) communication system, and/or the like.

The RAN 204, 214 may be enabled to communicate with and/or otherwise operatively access other devices and/or resources as represented simply by a cloud 212. For example, the cloud 212 may include one or more communication devices, systems, networks, or services, and/or one or more computing devices, systems, networks, or services, and/or the like or any combination thereof.

In various examples, the RAN 204, 214 may utilize any suitable multiple access and multiplexing scheme, including but not limited to Code Division Multiple Access (CDMA), Time Division Multiple Access (TDMA), Frequency Division Multiple Access (FDMA), Orthogonal Frequency Division Multiple Access (OFDMA), Single-Carrier Frequency Division Multiple Access (SC-FDMA), etc. In examples where the RAN 204, 214 is a WWAN, the network may implement one or more standardized RATs such as Digital Advanced Mobile Phone System (D-AMPS), IS-95, cdma2000, Global System for Mobile Communications (GSM), UMTS, eUTRA (LTE), or any other suitable RAT. GSM, UMTS, and eUTRA are described in documents from a consortium named "3rd Generation Partnership Project" (3GPP). IS-95 and cdma2000 are described in documents from a consortium named "3rd Generation Partnership Project 2" (3GPP2). 3GPP and 3GPP2 documents are publicly available. In examples where the RAN 204, 214 is a WLAN, the network may be an IEEE 802.11x network, or any other suitable network type. In examples where the RAN 204, 214 is a WPAN, the network may be a Bluetooth network, an IEEE 802.15x, or any other suitable network type.

A wireless communication device 202a-202d may include at least one radio (also referred to as a transceiver). The terms "radio" or "transceiver" as used herein refers to any circuitry and/or the like that may be enabled to receive wireless signals and/or transmit wireless signals. In particular aspects, two or more radios may be enabled to share a portion of circuitry and/or the like (e.g., a processing unit, memory, etc.). That is the terms "radio" or "transceiver" may be interpreted to include devices that have the capability to both transmit and receive signals, including devices having separate transmitters and receivers, devices having combined circuitry for transmitting and receiving signals, and/or the like.

In some aspects, a wireless communication device 202a-202d may include a first radio enabled to receive and/or transmit wireless signals associated with at least a first network of a RAN 204, 214 and a second radio that is enabled to receive and/or transmit wireless signals associated with an access point 206, 208, 210, a peer device or other transmitter that may geographically overlap or be collocated with the RAN 204, 214, and/or a navigation system 206 (e.g., a satellite positioning system and/or the like).

Overview of Interference Cancellation in a Wireless Communications Device

Figure 3:
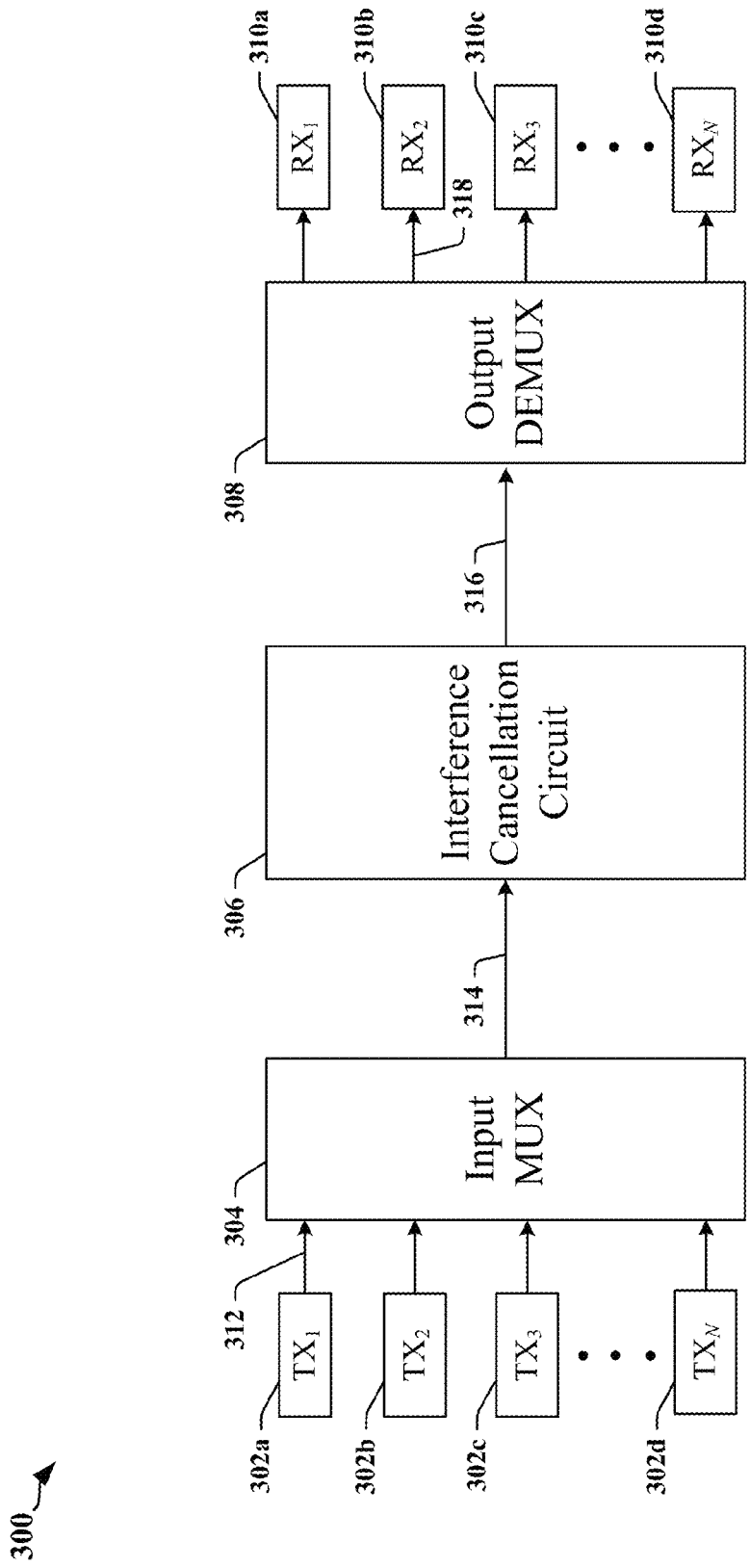
FIG. 3 is a block diagram of a wireless communication device having plural transmitters and plural receivers, according to various embodiments of the disclosure.

FIG. 3 is a block diagram illustrating a wireless communication device 300 that includes a plurality of transmitters 302a-302d and a plurality of receivers 310a-310d, in accordance with certain aspects disclosed herein. The transmitters 302a-302d and receivers 310a-310d may be provided as N receiver/transmitter (Rx/Tx) circuits, including a first Rx/Tx circuit 310a/302a, a second Rx/Tx circuit 310b/302b, a third Rx/Tx circuit 310c/302c, and an Nth Rx/Tx circuit 310d/302d, Coexistence issues may occur when one or more transmitters 302a-302d are actively transmitting, and one or more receivers 310a-310d are actively receiving.

Each of the Rx/Tx circuits 310a/302a, 310b/302b, 310c/302c, and/or 310d/302d may be configured to operate according to certain parameters including, for example, a respective frequency, radio frequency circuits with group delays, coupling channel gains to other Tx/Rx circuits Rx/Tx circuits 310a/302a, 310b/302b, 310c/302c, 310d/302d, and/or the like. For instance, the first Tx/Rx circuit 310a/302a may operate at a first frequency $f_1$ with a first delay $d_1$, the second Tx/Rx circuit 310b/302b may operate at a second frequency $f_2$ with a second delay $d_2$, the third Tx/Rx circuit 310c/302c may operate at a third frequency $f_3$ with a third delay $d_3$, and the N-th Tx/Rx circuit 310d/302d may operate at an N-th frequency $f_N$ with an N-th delay $d_N$. The first Tx/Rx circuit 310a/302a may have a coupling channel gain $h_{12}$ to the second Tx/Rx circuit 310b/302b, a coupling channel gain $h_{13}$ to the third Tx/Rx circuit 310c/302c, and a coupling channel gain $h_{1N}$ to the N-th Tx/Rx circuit 310d/302d, respectively. Other Tx/Rx circuits 310a/302a, 310b/302b, 310c/302c, 310d/302d may have different coupling channel gains to various Tx/Rx circuit 310a/302a, 310b/302b, 310c/302c, 310d/302d.

In various aspects, the apparatus 301 may be configured to reduce interference produced among Tx/Rx circuits 310a/302a, 310b/302b, 310c/302c, 310d/302d operating, for example, on the same, adjacent, harmonic, or sub-harmonic frequencies. An apparatus 300 may be configured or adapted for different Tx/Rx circuit combinations. That is, the apparatus 300 may be configured to cancel interference based on a co-existence issue caused by current combination of Tx/Rx circuits 310a/302a, 310b/302b, 310c/302c, and/or 310d/302d. For example, a co-existence issue at a time $T_1$ may be caused when the first transmitter 302a is employed for WiFi and the second receiver 310b is employed for Bluetooth. In conventional systems, the apparatus may be configured to selectively provide the output 312 of the first transmitter 302a to an interference cancelling (IC) circuit 306, which may then provide an interference cancellation signal 318 to the second receiver 310b. Accordingly, the interference cancellation circuit 306 may operate to reduce interference caused by the aggressor Tx/Rx circuit 310a/302a upon the victim Tx/Rx circuit 310b/302b. In one example, the coupling channel gain from the aggressor 310a/302a to the victim Tx/Rx circuit 310b/302b may be −10 dB based on separation of two antennas, and the interference cancellation circuit 306 may be configured to match this gain for successful interference cancellation. In some examples, the apparatus 300 may include a multiplexer (MUX) circuit 304 and a demultiplexer (DEMUX) circuit 308 that may be controlled to select an interference cancellation configuration.

Figure 4:
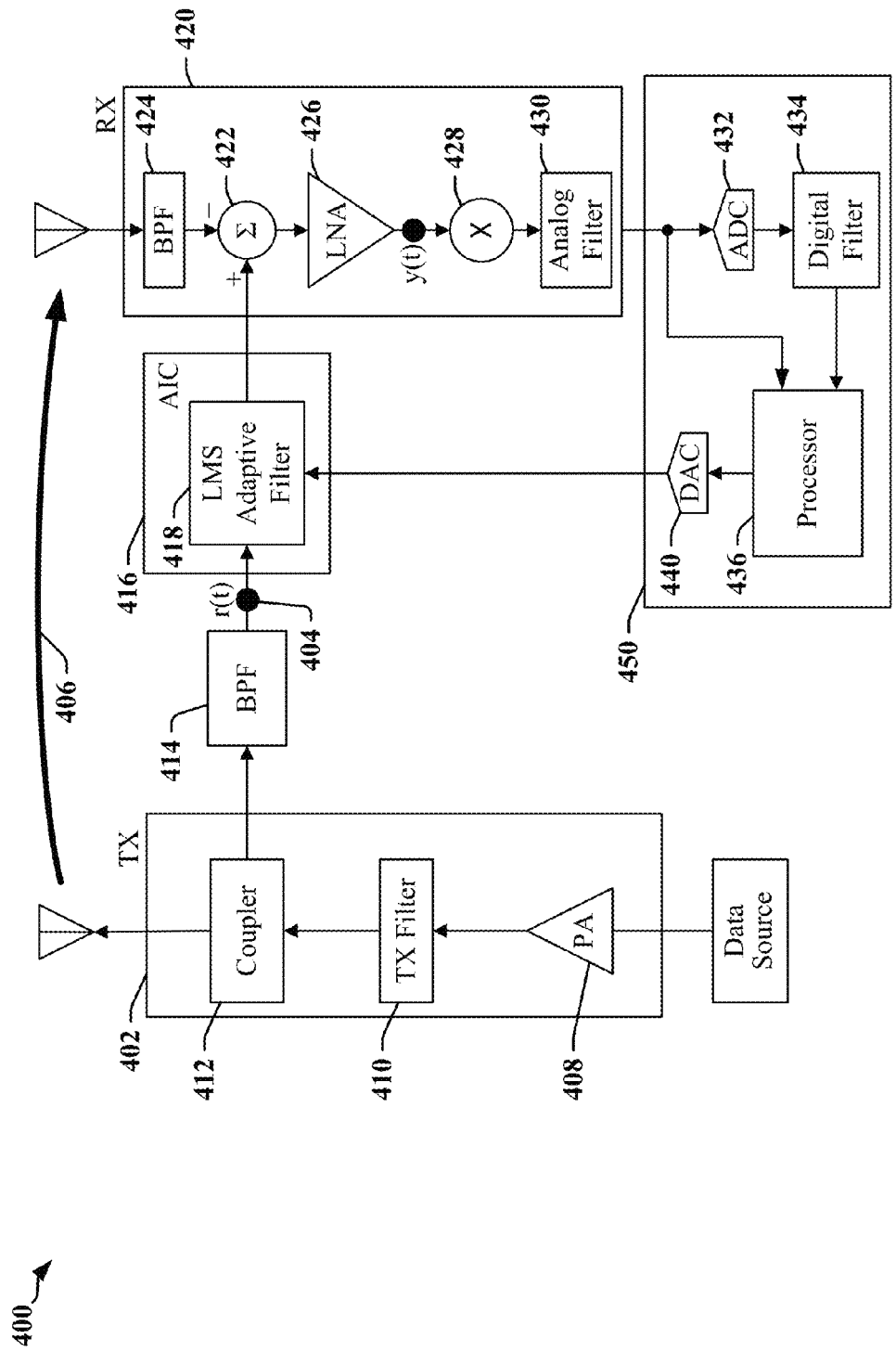
FIG. 4 is a block diagram illustrating a system that may be adapted for performing interference cancellation according to various aspects disclosed herein.

FIG. 4 illustrates certain aspects of a system 400 that may be used for cancelling in-device interference between a transmitter 402 and a receiver 420 in accordance with certain aspects disclosed herein. The system 400 may be associated with one or more subsystems, apparatus, devices, or components. The transmitter (Tx) 402 may be an offending transmitter and the receiver 420 may be a victim receiver. That is, the transmitter 402 may be an offender that generates or causes in-device interference in connection with an over-the-air signal 406 received by the victim receiver 420. The offending transmitter 402 and victim receiver 420 may be part of the same device. Moreover, while a single transmitter 402 and a single receiver 420 are shown, more than one transmitter 402 and/or more than one receiver 420 may be provided in accordance with aspects of the disclosure.

The transmitter 402 may be associated with, or coupled to, a power amplifier (PA) 408 and a Tx filter 410, which components are well-known in the art and so a further description is omitted for the sake of brevity. The PA 408 may receive a signal or data for transmission by the Tx 402.

The transmitter 402 may be associated with a coupler 412. The coupler 412 may be used to provide a reference signal r(t) 404 to an AIC circuit 416. The reference signal may correspond to some portion or function of the signal transmitted by the transmitter 402, and may be provided through a bandpass filter (BPF) 414. In one example, the AIC circuit 416 may include a one-tap least mean squares (LMS) adaptive filter 418. Broadly, the AIC circuit 416 may be configured to generate an output signal that matches the over-the-air interfering signal 406 as closely as possible, such that the AIC output can be combined with the interfering signal 406 in a destructive fashion to cancel the in-device interference signal. The AIC 416 and/or the LMS adaptive filter 418 may be configured to generate an output that can be supplied as a first input to a combiner, integrator, or adder 422. A second input to the adder 422 may correspond to the signal 406 received by the receiver (Rx) 420. In some instances, the signal 406 may be provided to the adder 422 through a BPF 424.

The adder 422 may be configured to combine its inputs in order to generate an output that is provided to a low-noise amplifier (LNA) 426. In one example, the adder 422 may be configured to subtract the input provided by the AIC 416 and/or LMS filter 418 from the input received from the BPF 424. In an ideal case where selection of LMS filter coefficients is perfect, the signal provided at the first input of the adder 422 is equal to the interference associated with the over-the-air signal 406, such that the interference is removed in the signal provided to the LNA 426. In this respect, the path from the coupler 412, through the BPF 414, to the AIC 416/filter 418 may serve as a reference path in order to provide a reference signal r(t).

The system 400 may provide for the BPF 414 in the reference signal path and the BPF 424 coupled to the receiver antenna to have substantially the same filter characteristics. That is, filtering both signals in substantially the same way can help ensure that any timing mismatch between the reference signal r(t) and the received signal 406 is reduced or eliminated.

In some instances, the AIC circuit 416 may be configured using information that is based on the received signal after it is converted into a baseband signal. In one example, a coefficient controller 450 may derive one or more coefficients from a baseband signal and configure the AIC 416 based on the coefficients. That is, the output y(t) from the LNA 426 may be provided to a mixer 428. The mixer 428 then coverts the output y(t) from the LNA 426 from a first signal domain or frequency to a second signal domain or frequency. For example, the first signal domain may relate to a selected radio frequency and the second signal domain may relate to baseband frequencies. Here, a baseband signal may include an unmodulated signal, a lowpass signal, or a signal at relatively low frequencies, in some examples corresponding to an audible range up to 20 kHz, for example. In some instances, the mixer 428 may receive a signal from an oscillator such as a voltage-controlled oscillator (VCO) in order to provide the conversion to baseband.

The output baseband signal from the mixer 428 may be provided to an analog filter 430 that may operate as an anti-aliasing filter. The output of the filter 430 may be provided to an analog-to-digital converter (ADC) 432. The output of the ADC 432 may optionally be provided to a digital filter 434. The output of the digital filter 434 may be provided to a processor 436. In some instances, the digital filter 434 may be omitted such that the processor 436 may compute the digital coefficient directly from digital samples of the baseband signal output from the ADC 432.

The processor 436 may be configured to generate and output one or more signals representative of DC offset, and/or LMS coefficients to the AIC circuit 416. The processor 436 may produce an output in a digital format, and the output may be provided to a digital-to-analog converter (DAC) 440. The output of the DAC 440 may then be provided to the AIC 416 and/or the LMS filter 418.

Interference cancellation circuits provided according to certain aspects disclosed herein can be adapted to simultaneously handle multiple interference sources and/or types that may affect a receiver. In one example, a source of interference may be a nearby and/or in-device transmit antenna that transmits LTE signals in frequencies allocated to LTE. These LTE signals can produce strong interference at a Wi-Fi receive antenna. Different types of interference may be produced, including interference caused by out-of-band (OOB) emission, fundamental emission, and phase noise. Interference may be produced even if the frequencies used by the Wi-Fi channel are far from the frequencies used by LTE. In one specific example, interference may occur between the 2.462 GHz Wi-Fi Channel 11 and LTE transmissions in LTE band 40 (B40), which is allocated frequencies between 2.3 GHz and 2.4 GHz with a bandwidth of 100 MHz. Interference may occur because the channelization filter, which may be an analog anti-aliasing filter, is placed after a mixer, and an excessive amount of energy falls into the Wi-Fi band, and saturates Rx front end.

Figure 5:
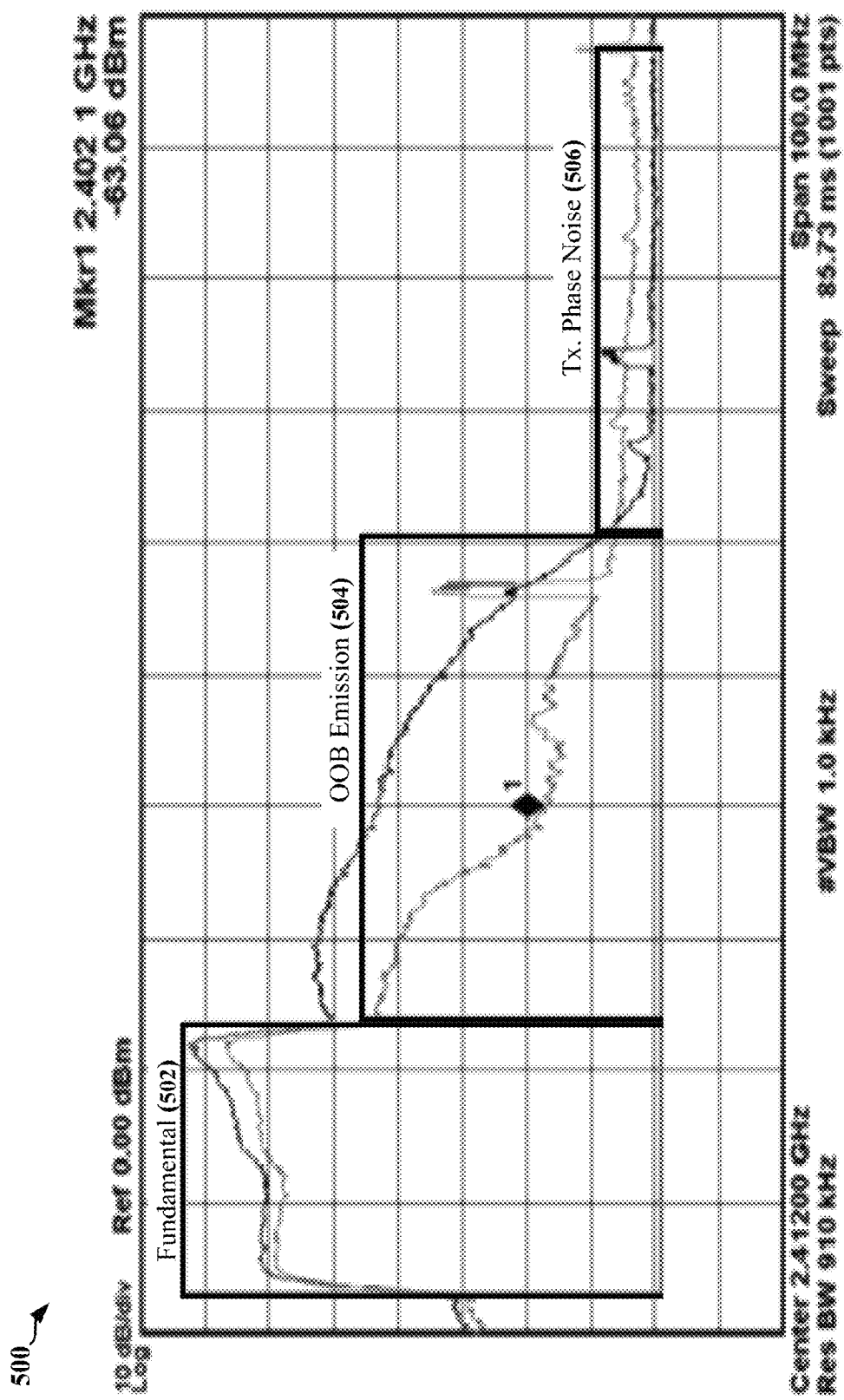
FIG. 5 is a graph that illustrates different types of interference.

Different types of interference can occur when a single device communicates using multiple RATs. In one example, a WLAN receiver tuned to 2.4 GHz may be victimized by LTE B40 transmissions on the fundamental frequencies and on OOB transmissions. The OOB transmissions may include, or be characterized as adjacent-channel interference represented by an Adjacent Channel Leakage Ratio (ACLR). FIG. 5 is a graph 500 that illustrates different types of interference, including interference 502 affecting fundamental frequencies, interference 504 exhibiting as OOB transmissions, and interference 506 attributable to transmitter phase noise. In many instances, the presence of interference 502 affecting fundamental frequencies is accompanied by OOB interference 506.

Transmissions at the LTE B40 fundamental frequency may contribute to the interference 502 affecting fundamental frequencies. In one example, band pass filters for industrial, scientific and medical (ISM) radio bands at 2.4 GHz may be less effective at rejecting fundamental frequencies of higher-end LTE B40 signals, due to imperfect ISM filter characteristics for example. The receiver front end may become saturated even when higher-frequencies of the Wi-Fi channel are used, including the 2.462 GHz channel Wi-Fi channel. In this example, analog interference cancellation may produce beneficial results and may be configured to cancel interference at the frequency with highest residual power.

OOB emissions associated with LTE B40 transmissions can produce interference when the side lobes (skirts) of the LTE B40 transmissions fall within Wi-Fi channel, including Wi-Fi channel 1 at 2.412 GHz for example. OOB interference may be cancelled by digitally controlling analog LMS coefficients.

Figure 6:
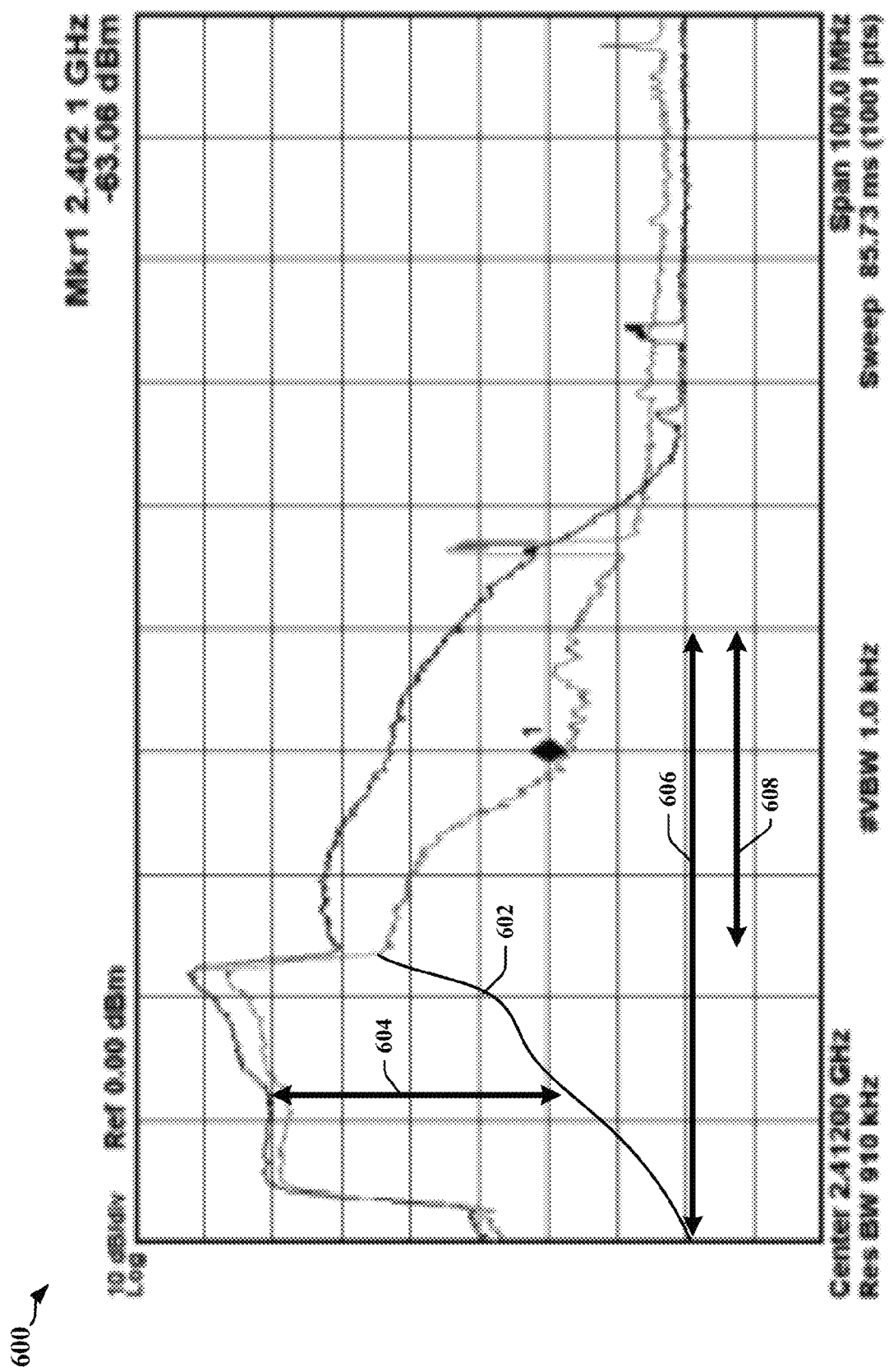
FIG. 6 is a graph that illustrates effectiveness of certain aspects of interference cancellation.

Certain aspects disclosed herein provide systems and methods for adaptive cancellation of interference caused by fundamental transmissions and OOB emission. Cancellation may be selectively performed in analog and digital domains, whereby the LMS coefficients can be computed in analog or digital domains adaptively. FIG. 6 is a graph 600 that illustrates certain aspects of interference cancellation that may be useful in characterizing the effectiveness and/or efficiency of a selected cancellation scheme. For example, an analog filter may produce a signal 602 that exhibits a level of suppression 604 with an associated RF cost function 606, and/or baseband cost function 608.

Switched Cancellation

Figure 7:
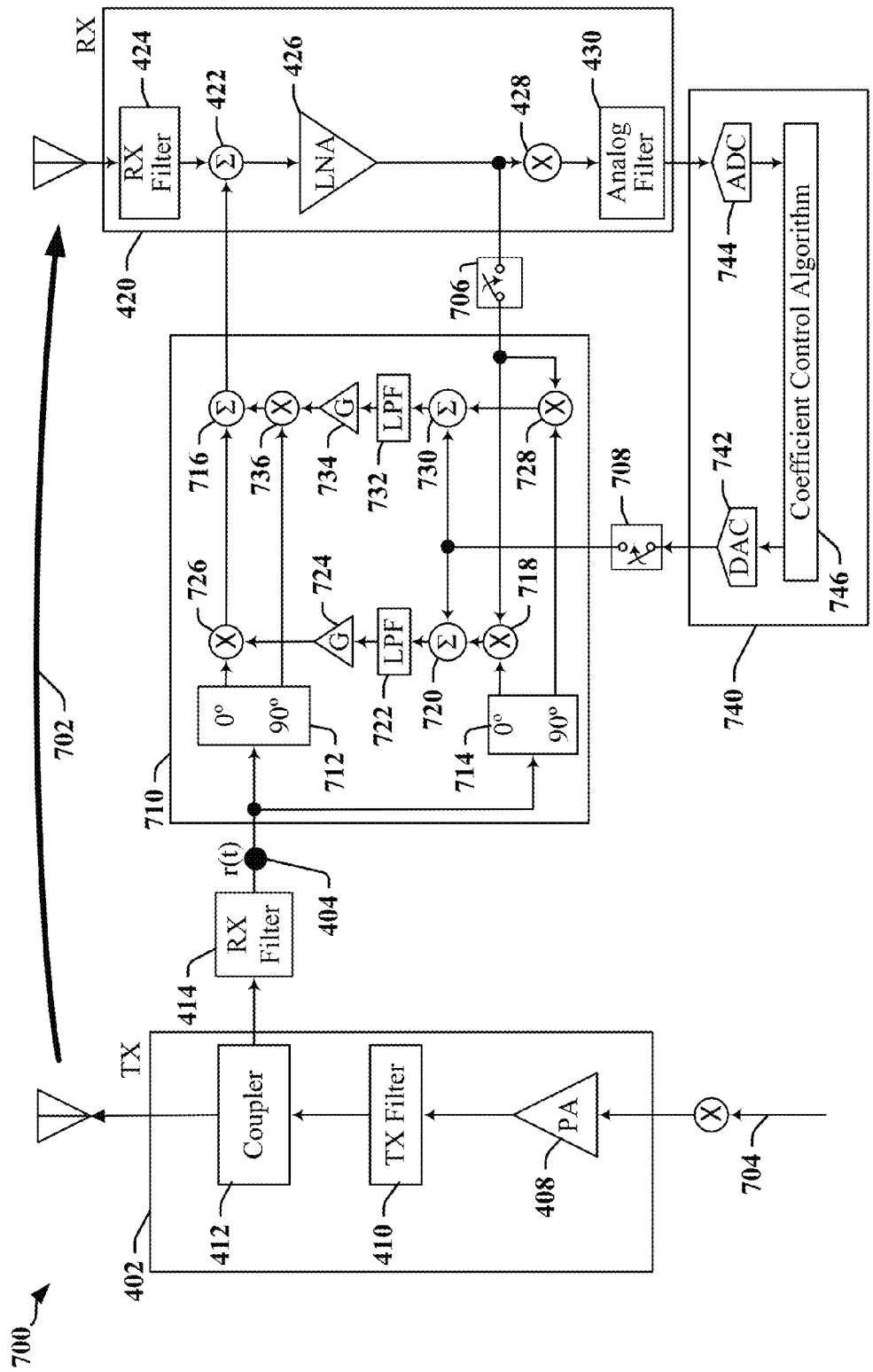
FIG. 7 is a block schematic diagram that illustrates a first example of adaptive interference cancellation system in accordance with certain aspects disclosed herein.

FIG. 7 is a block schematic diagram that illustrates a first example of adaptive interference cancellation system 700 in accordance with certain aspects disclosed herein. A transmitter circuit 402 of a communications device (see also FIG. 4) operates in a manner that interferes with a receiver circuit 420 in the device. In this example, an adaptive interference cancellation circuit 710 is provided that can be configured to cancel interference 702 from the transmitter circuit 402 that affects fundamental and/or OOB frequencies. In some instances, the interference cancellation circuit is configured to cancel interference in the fundamental frequency when the interference in the fundamental frequency exceeds a predefined threshold power level. If interference in the fundamental frequency range is not significant, then the adaptive interference cancellation circuit 710 may be configured to address OOB interference.

The mode of operation of the adaptive interference cancellation circuit 710 may be configured using a pair of switches 706, 708 that may be controlled to determine whether the adaptive interference cancellation circuit 710 uses an analog coefficient or feedback from the analog RF signal path to cancel fundamental frequency interference, and/or digital coefficients of feedback from a baseband signal representative of the RF signal to cancel OOB interference. In a first mode of operation, a first switch 706 may be closed to provide analog feedback to the interference cancellation circuit 710. In a second mode of operation, a second switch 708 may be closed such that digital feedback is received through the second switch 708, where the digital feedback is calculated from digital baseband signals.

In the first mode of operation, the AIC circuit 710 may operate on both OOB and fundamental interference using a one-tap LMS filter when the first switch 706 is closed. The AIC circuit 710 may receive a reference signal r(t) 404 from the interfering transmitter circuit 402 for interference cancellation. The AIC circuit 710 may include polyphase components 712 and 714. The polyphase components 712 and 714 may be used to generate in-phase and quadrature signal outputs relative to the reference signal 404. The in-phase signal output may be generated by simply passing the reference signal 404 with no phase shift (e.g., a 0 degree phase shift). The quadrature signal output may be generated by applying a 90 degree phase shift to the reference signal 404.

The in-phase signal output by a first polyphase component 712 is provided to a mixer 726. The quadrature signal output by the first polyphase component 712 is provided to a mixer 736. The outputs of the mixers 726, 736 are provided to an adder, integrator, or combiner 716. The output of the adder 716 serves as an input to the adder 422.

The in-phase signal output by a second polyphase component 714 is provided to a mixer 718. The quadrature signal output by the second polyphase component 714 is provided to a mixer 728. The mixers 718, 728 each receive a second input corresponding to the output of the LNA 426 through the closed switch 706. That is, in some aspects of the disclosure, feedback corresponding to the output signal of the receiver circuit 420 is provided as an input to the AIC circuit 710.

The output of the mixer 718 is provided to a first adder or integrator 720. The output of the mixer 728 is provided to a second adder or integrator 730. A second input to each of the integrators 720, 730 is provided by a controller 740 that generates coefficients from the digitized received signal that may be used to steer the AIC circuit 710. The outputs of the integrators 720, 730 may be provided to one or more filters, including first and second low pass filters (LPFs) 722 and 732, respectively. The outputs of the first and second LPFs 722, 732 may be provided to one or more amplifiers 724 and 734, respectively. The amplifiers 724, 734 may each have independently controlled gain (G) values. In some instances, a common gain may be used in connection with both of the amplifiers 724 and 734. The outputs of the amplifiers 724, 734 may be provided as inputs to the mixers 726 and 736, respectively.

In the second mode of operation, the AIC circuit 710 may operate on the OOB interference using digital feedback coefficients received through the second switch 708. Certain aspects of the operation of the LMS filter 710 are similar to the aspects of the operation of the LMS filter 710 in the first mode, and so, a complete re-description is omitted for the sake of brevity. In the second mode of operation, a second input to each of the integrators 720, 730 corresponds to coefficients and/or offsets output by a coefficient algorithm 746 executed by the controller 740. The coefficients are not directly based on the RF signal output by the LNA 426, but rather, the coefficients are based on the received signal after it is converted into a baseband signal using an analog-to-digital converter (ADC) 744. That is, a coefficient controller 740 may generate one or more coefficients from the baseband signal to steer the AIC circuit 710. Digital coefficients may be converted to an analog signal using a digital-to-analog converter 742.

Figure 8:
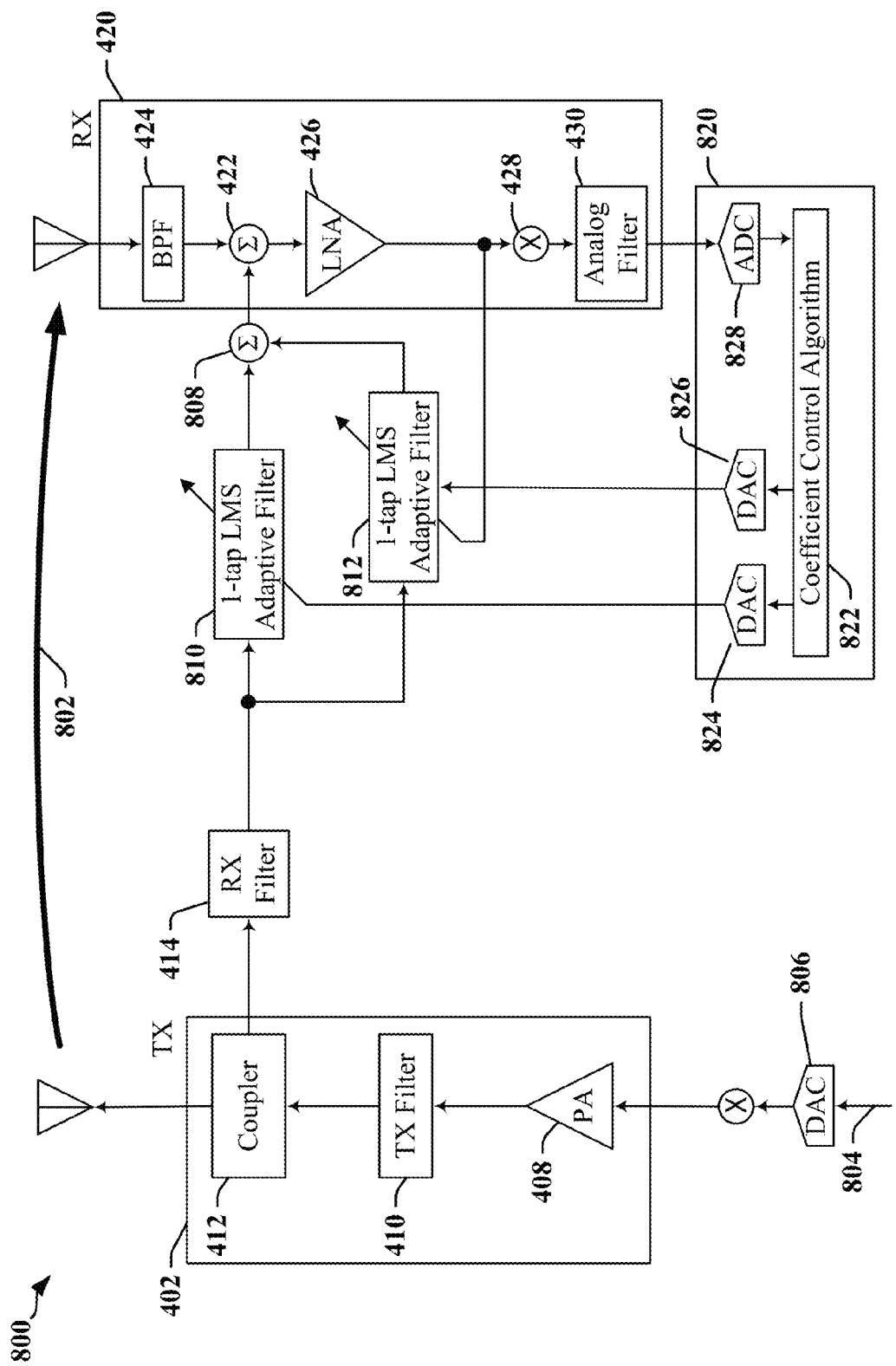
FIG. 8 is a block schematic diagram that illustrates a second example of adaptive interference cancellation system in accordance with certain aspects disclosed herein.

FIG. 8 is a block schematic diagram that illustrates a second example of a system 800 that provides adaptive interference cancellation in accordance with certain aspects disclosed herein. In this example, AIC may be implemented using two-tap LMS to simultaneously cancel interference 802 in a receiver circuit 420 from a transmitter circuit 402 of a communications device (see FIG. 4). A first 1-tap LMS adaptive filter 810 may be configured to cancel OOB interference using feedback from the digital path, while a second 1-tap LMS adaptive filter 812 cancels interference at the fundamental frequency using analog feedback. A coefficient controller 820 may derive coefficients from the baseband signal to steer the LMS filters 810, 812. Digital coefficients generated by the coefficient controller 820 for the first LMS filter 810 and the second LMS filter 812 may be converted to analog signals using DACs 824 and 826, respectively.

In operation, the first LMS filter 810 is controlled using digital feedback and may be employed to cancel interference caused by OOB emission. The second LMS filter 812 receives analog and RF feedback and digital feedback through the steering coefficients. The second LMS filter 812 may be used for cancelling interference at the fundamental frequency.

According to certain aspects, simultaneous interference cancellation may be used to combat other combinations of interference. Simultaneous interference cancellation may provide improved cancellation gain through the cumulative effect of the simultaneous cancellation of fundamental and OOB interference.

In at least some instances, the operation of the two LMS filters 810, 812 may be controlled using switches to select a desired form or combination of cancellation. In one example, one LMS filter 810 or 812 may be always active while the other LMS filter 812 or 810 may be activated opportunistically.

Figure 9:
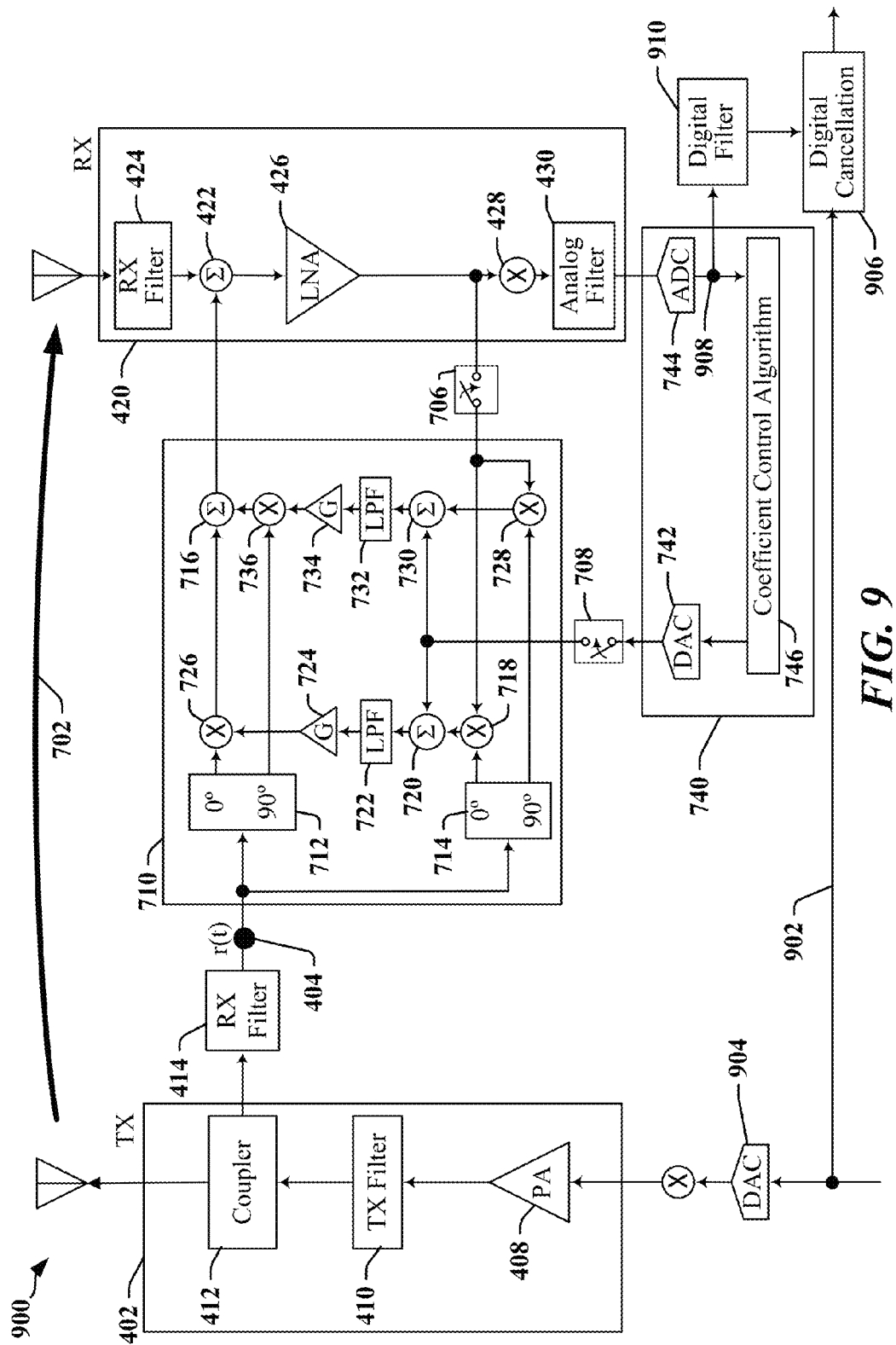
FIG. 9 is a block schematic diagram that illustrates a third example of adaptive interference cancellation system in accordance with certain aspects disclosed herein.

FIG. 9 is a block schematic diagram that illustrates a third example of a system 900 that provides adaptive interference cancellation in accordance with certain aspects disclosed herein. In this example, AIC is implemented using a modified version of the example AIC circuit 710 depicted in FIG. 7 to provide cascade cancellation. Here, a digital cancellation circuit and/or module 906 is provided with a digital transmitter input 902 that is converted to analog by a DAC 904 before processing by the transmitter 402. The digital transmitter input 902 may be used by the digital cancellation circuit and/or module 906 to cancel OOB interference in a digital output signal 908 derived from the receiver 420. The digital output signal 908 may be processed by one or more digital filters 910 before it is provided to the digital cancellation circuit and/or module 906. AIC may be performed as described in relation to the operation of the LMS 710 (see FIG. 7).

In this third example of adaptive interference cancellation, analog cancellation is performed before digital interference cancellation. The analog interference cancellation process is unaffected by the digital interference cancellation. Digital interference cancellation may be performed with knowledge of the preceding analog interference cancellation. In some instances, the LMS filter 710 may perform certain aspects of digital interference cancellation, including AIC related to RF interference. Accordingly, cumulative cancellation gains may be achieved.

Certain benefits may be accrued by providing the capability to use both digital and analog cancellation. Analog interference cancellation can be used to prevent pre-saturation in the LNA 426 and analog interference cancellation systems may easily model behavior of the PA 408. Digital interference cancellation cannot typically prevent pre-saturation in the LNA 426 and modeling of the behavior of the PA 408 is relatively complex in digital interference cancellation systems. Digital interference cancellation does not require the use of a coupler 412 in the Tx signal path, and the Tx signal is not degraded by the use of digital interference cancellation. Analog interference cancellation may require the addition of RF components in the RF signal chain, and may increase the noise figure (NF) when interference power is low, where NF is a measures of degradation of the signal-to-noise ratio (SNR) caused by components in the RF signal chain. Digital interference cancellation does not require the insertion of additional RF components and therefore has no effect on NF, but digital interference cancellation may require increased use of vector processing engines on baseband signals. Analog interference cancellation may employ vector processing engines to generate and coefficients, although the use of digitally controlled coefficients may permit dynamic on/off control of the analog interference cancellation process. Digital interference cancellation can be easily enabled and disabled.

Both analog interference cancellation and digital interference cancellation can be implemented with multiple antennas and/or in a manner that provides robustness under dynamic conditions, including fading in the channel, etc. Analog interference cancellation can mitigate multi-radio coexistence, while digital interference cancellation may mitigate multi-radio coexistence provided certain latency requirements, and time/frequency synchronization requirements are met. Both analog interference cancellation and digital interference cancellation can adapt to different scenarios, although the configuration of the processing environment may need to be reconfigured under changing scenarios.

Figure 10:
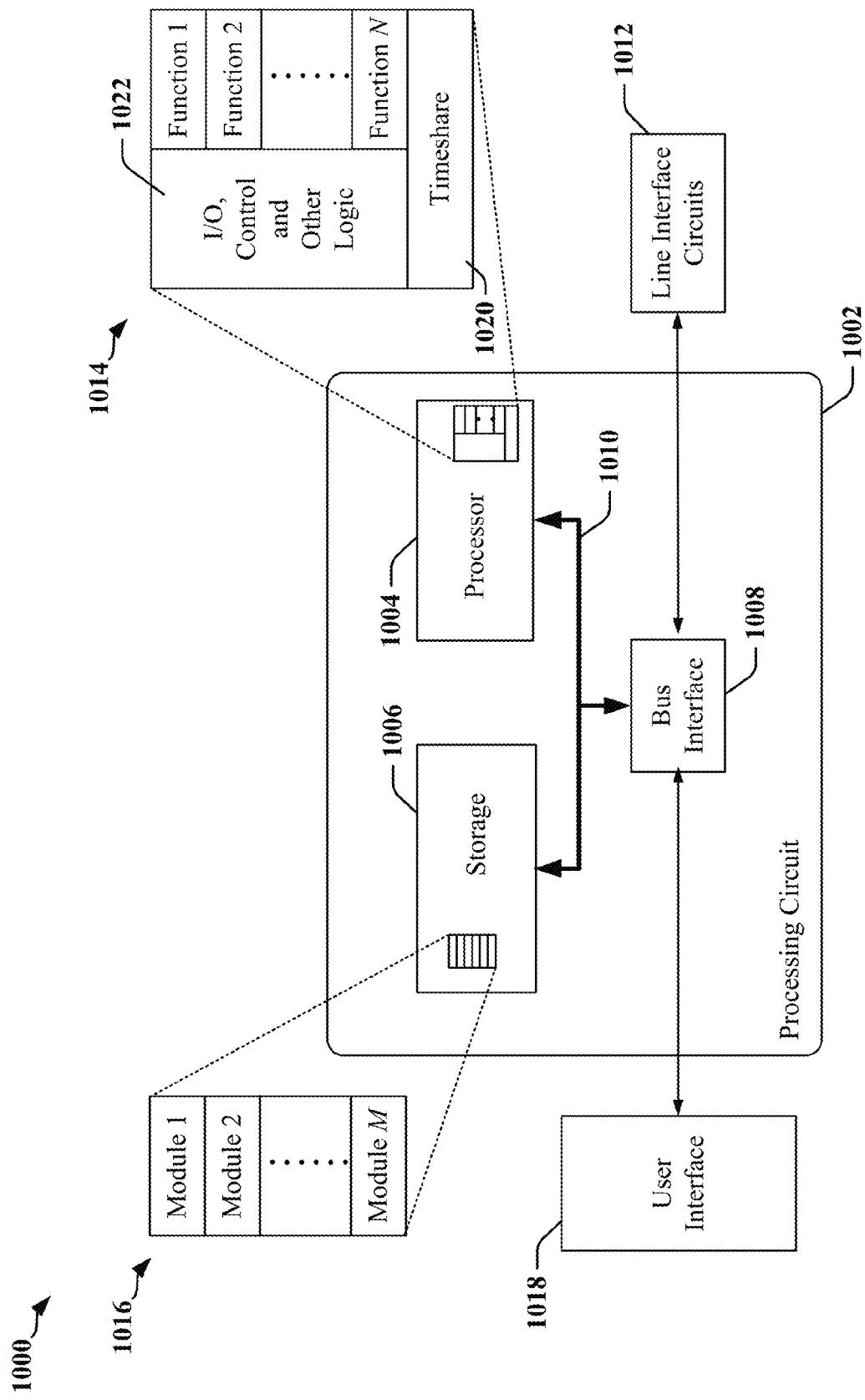
FIG. 10 is a block diagram illustrating an example of an apparatus employing a processing circuit that may be adapted according to certain aspects disclosed herein.

FIG. 10 is a conceptual diagram 1000 illustrating a simplified example of a hardware implementation for an apparatus employing a processing circuit 1002 that may be configured to perform one or more functions disclosed herein. In accordance with various aspects of the disclosure, an element, or any portion of an element, or any combination of elements as disclosed herein may be implemented using the processing circuit 1002. The processing circuit 1002 may include one or more processors 1004 that are controlled by some combination of hardware and software modules. Examples of processors 1004 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 1004 may include specialized processors that perform specific functions, and that may be configured, augmented or controlled by one of the software modules 1016. The one or more processors 1004 may be configured through a combination of software modules 1016 loaded during initialization, and further configured by loading or unloading one or more software modules 1016 during operation.

In the illustrated example, the processing circuit 1002 may be implemented with a bus architecture, represented generally by the bus 1010. The bus 1010 may include any number of interconnecting buses and bridges depending on the specific application of the processing circuit 1002 and the overall design constraints. The bus 1010 links together various circuits including the one or more processors 1004, and storage 1006. Storage 1006 may include memory devices and mass storage devices, and may be referred to herein as computer-readable media and/or processor-readable media. The bus 1010 may also link various other circuits such as timing sources, timers, peripherals, voltage regulators, and power management circuits. A bus interface 1008 may provide an interface between the bus 1010 and one or more transceivers 1012. A transceiver 1012 may be provided for each networking technology supported by the processing circuit. In some instances, multiple networking technologies may share some or all of the circuitry or processing modules found in a transceiver 1012. Each transceiver 1012 provides a means for communicating with various other apparatus over a transmission medium. Depending upon the nature of the apparatus, a user interface 1018 (e.g., keypad, display, speaker, microphone, joystick) may also be provided, and may be communicatively coupled to the bus 1010 directly or through the bus interface 1008.

A processor 1004 may be responsible for managing the bus 1010 and for general processing that may include the execution of software stored in a computer-readable medium that may include the storage 1006. In this respect, the processing circuit 1002, including the processor 1004, may be used to implement any of the methods, functions and techniques disclosed herein. The storage 1006 may be used for storing data that is manipulated by the processor 1004 when executing software, and the software may be configured to implement any one of the methods disclosed herein.

One or more processors 1004 in the processing circuit 1002 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 1006 or in an external computer readable medium. The external computer-readable medium and/or storage 1006 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 1006 may also include, by way of example, a carrier wave, a transmission line, and any other suitable medium for transmitting software and/or instructions that may be accessed and read by a computer. Computer-readable medium and/or the storage 1006 may reside in the processing circuit 1002, in the processor 1004, external to the processing circuit 1002, or be distributed across multiple entities including the processing circuit 1002. The computer-readable medium and/or storage 1006 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 1006 may maintain software maintained and/or organized in loadable code segments, modules, applications, programs, etc., which may be referred to herein as software modules 1016. Each of the software modules 1016 may include instructions and data that, when installed or loaded on the processing circuit 1002 and executed by the one or more processors 1004, contribute to a run-time image 1014 that controls the operation of the one or more processors 1004. When executed, certain instructions may cause the processing circuit 1002 to perform functions in accordance with certain methods, algorithms and processes described herein.

Some of the software modules 1016 may be loaded during initialization of the processing circuit 1002, and these software modules 1016 may configure the processing circuit 1002 to enable performance of the various functions disclosed herein. For example, some software modules 1016 may configure internal devices and/or logic circuits 1022 of the processor 1004, and may manage access to external devices such as the transceiver 1012, the bus interface 1008, the user interface 1018, timers, mathematical coprocessors, and so on. The software modules 1016 may include a control program and/or an operating system that interacts with interrupt handlers and device drivers, and that controls access to various resources provided by the processing circuit 1002. The resources may include memory, processing time, access to the transceiver 1012, the user interface 1018, and so on.

One or more processors 1004 of the processing circuit 1002 may be multifunctional, whereby some of the software modules 1016 are loaded and configured to perform different functions or different instances of the same function. The one or more processors 1004 may additionally be adapted to manage background tasks initiated in response to inputs from the user interface 1018, the transceiver 1012, and device drivers, for example. To support the performance of multiple functions, the one or more processors 1004 may be configured to provide a multitasking environment, whereby each of a plurality of functions is implemented as a set of tasks serviced by the one or more processors 1004 as needed or desired. In one example, the multitasking environment may be implemented using a timesharing program 1020 that passes control of a processor 1004 between different tasks, whereby each task returns control of the one or more processors 1004 to the timesharing program 1020 upon completion of any outstanding operations and/or in response to an input such as an interrupt. When a task has control of the one or more processors 1004, the processing circuit is effectively specialized for the purposes addressed by the function associated with the controlling task. The timesharing program 1020 may include an operating system, a main loop that transfers control on a round-robin basis, a function that allocates control of the one or more processors 1004 in accordance with a prioritization of the functions, and/or an interrupt driven main loop that responds to external events by providing control of the one or more processors 1004 to a handling function.

Figure 11:
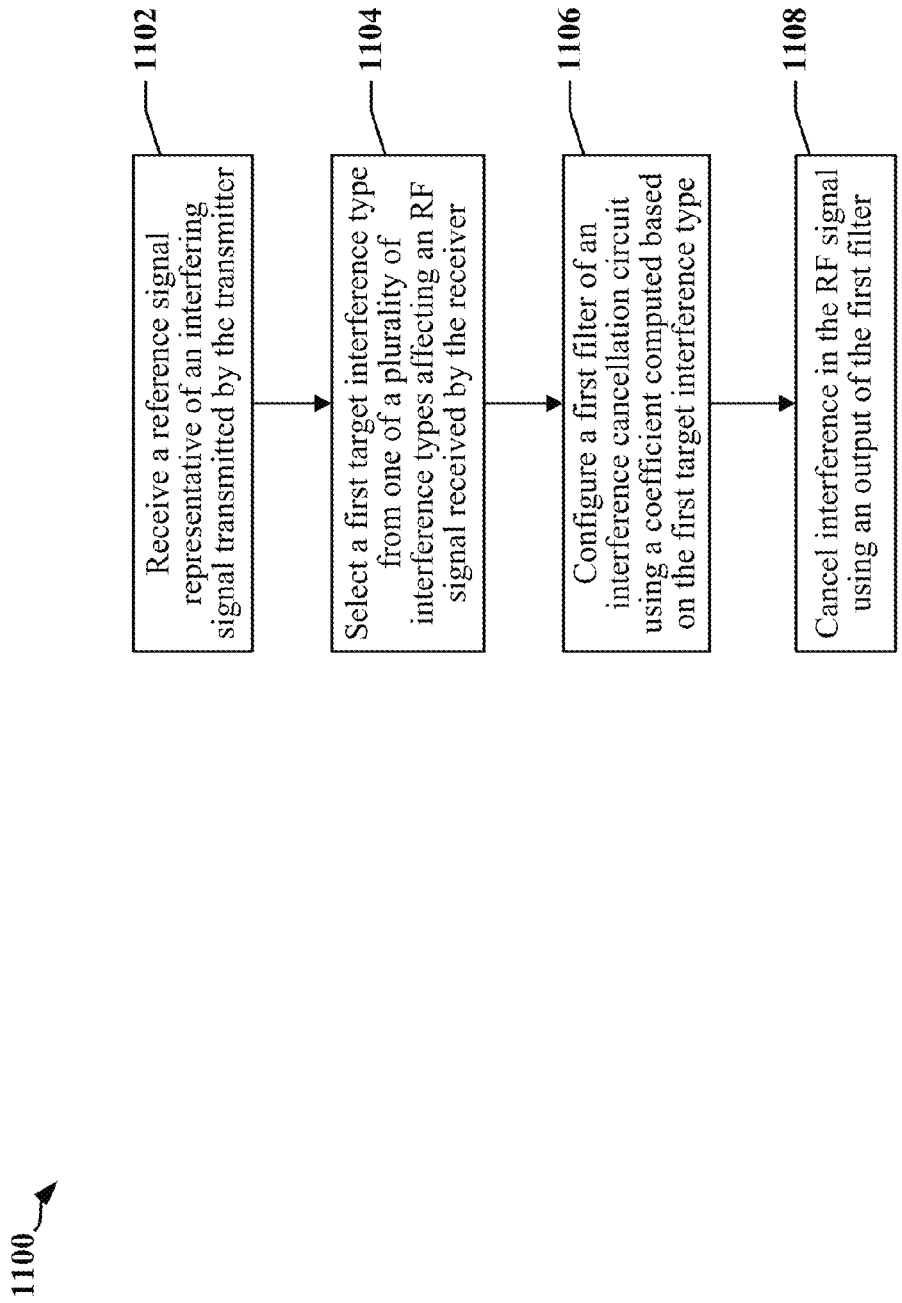
FIG. 11 is a flow chart of a method of wireless communication.

FIG. 11 is a flow chart 1100 of a method of wireless communication. The method may be performed by a device having one or more transmitters and one or more receivers, where the device is configured to transmit signals in accordance with a first RAT while receiving signals transmitted in accordance with a second RAT.

At block 1102, the device may receive a reference signal representative of an interfering signal transmitted by the transmitter.

At block 1104, the device may select a first target interference type from one of a plurality of interference types affecting an RF signal received by the receiver. The first target interference type may be selected by determining whether interference at a fundamental frequency of the RF signal exceeds a threshold level, selecting fundamental frequency interference as the target interference when the fundamental frequency of the RF signal exceeds the threshold level, and selecting out of band interference as the target interference when the fundamental frequency of the RF signal does not exceed the threshold level.

At block 1106, the device may configure a first filter of an interference cancellation circuit using a coefficient computed based on the first target interference type.

At block 1108, the device may cancel interference in the RF signal using an output of the first filter.

In one example, the first target interference type may include interference at a fundamental frequency of the RF signal, and the device may compute the coefficient in the analog domain.

In another example, the first target interference type may include out of band interference, and the device may compute the coefficient in the digital domain. The coefficient may be computed in the digital domain by computing the coefficient from a baseband representation of the received RF signal. The coefficient may be converted to an analog coefficient, and the analog coefficient may be applied to the interference cancellation circuit to cancel the interference in the RF signal.

In another example, the first target interference type includes interference at a fundamental frequency of the RF signal, and the device may provide the first filter an analog feedback signal representative of the RF signal. The output of the first filter may be generated using the analog feedback signal.

In another example, the first filter is configured by closing one or more switches based on the first target interference type. Each of the one or more switches may be configured to control the provision of a respective type of feedback to the first filter.

In another example, the first filter is configured by providing the first filter a baseband feedback signal generated from the coefficient.

In another example, the device may select a second target interference type from one of a plurality of interference types affecting the RF signal received by the receiver, configure a second filter of the interference cancellation circuit using a coefficient computed based on the second target interference type, and cancel interference in the RF signal using an output of the second filter while cancelling interference in the RF signal using the output of the first filter.

In another example, a baseband transmission signal may be received from the transmitter. The transmitter may be adapted to transmit an RF version of the baseband transmission signal. The device may cancel interference in a baseband representation of the received RF signal using the baseband transmission signal. The baseband transmission signal may include a digital signal.

In some examples, the first filter includes a least-mean squares filter.

Figure 12:
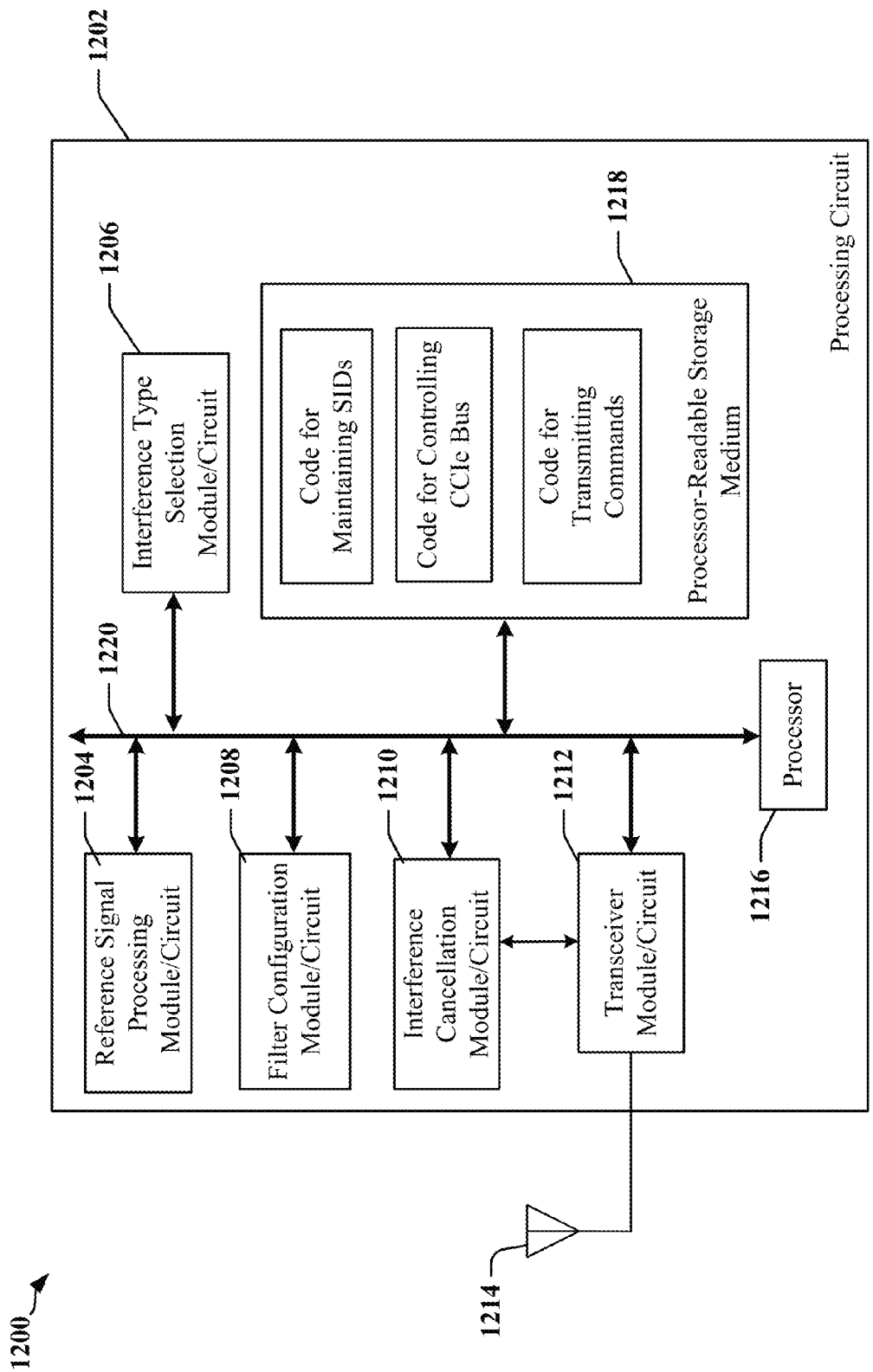
FIG. 12 is a diagram illustrating an example of a hardware implementation for an apparatus employing a processing employing a processing circuit adapted according to certain aspects disclosed herein.

FIG. 12 is a diagram 1200 illustrating a simplified example of a hardware implementation for an apparatus employing a processing circuit 1202. The processing circuit typically has a processor 1216 that may include one or more of a microprocessor, microcontroller, digital signal processor, a sequencer and a state machine. The processing circuit 1202 may be implemented with a bus architecture, represented generally by the bus 1220. The bus 1220 may include any number of interconnecting buses and bridges depending on the specific application of the processing circuit 1202 and the overall design constraints. The bus 1220 links together various circuits including one or more processors and/or hardware modules, represented by the processor 1216, the modules or circuits 1204, 1206 and 1208, transceiver circuits 1212 configurable to communicate over the one or more antennas 1214 and the computer-readable storage medium 1218. The bus 1220 may also link various other circuits such as timing sources, peripherals, voltage regulators, and power management circuits, which are well known in the art, and therefore, will not be described any further.

The processor 1216 is responsible for general processing, including the execution of software stored on the computer-readable storage medium 1216. The software, when executed by the processor 1216, causes the processing circuit 1202 to perform the various functions described supra for any particular apparatus. The computer-readable storage medium 1218 may also be used for storing data that is manipulated by the processor 1216 when executing software, including data transmitted or received in RF signals transmitted over the one or more antennas 1214, which may be configured as data lanes and clock lanes. The processing circuit 1202 further includes at least one of the modules 1204, 1206 and 1208. The modules 1204, 1206 and 1208 may be software modules running in the processor 1216, resident/stored in the computer readable storage medium 1218, one or more hardware modules coupled to the processor 1216, or some combination thereof. The modules 1204, 1206 and/or 1208 may include microcontroller instructions, state machine configuration parameters, or some combination thereof.

In one configuration, the apparatus 1200 for wireless communication includes a module and/or circuit 1204 that is configured to receive and process a reference signal representative of an interfering signal transmitted by apparatus 1200, a module and/or circuit 1206 configured to select a type of interference for cancellation, a module and/or circuit 1208 configured to configure a filter using RF, baseband or digital feedback, and a module and/or circuit 1210 configured to cancel interference in the RF signal.

In one example, the apparatus 1200 may be embodied in, and/or include one or more of the circuits illustrated in FIGS. 7-9. The combination of apparatus and circuits may include an interference cancelling circuit coupled to an RF receiver 420. The interference cancelling circuit may also be coupled to an RF transmitter 402. The interference cancelling circuit may include a first interference circuit configured to cancel interference at a fundamental frequency in an RF signal received by the RF receiver 420, and a second interference circuit configured to cancel out-of-band interference associated with the RF signal. In some instances, a digital cancellation circuit 906 may be configured to cancel interference in a baseband signal 908 derived from the RF signal using a digital representation of an interfering signal transmitted by a transmitter coupled to the interference cancelling circuit. The interference cancelling circuit may provide different types of cancellation that may be provided in switched, simultaneous and/or cascaded modes of operation.

In some instances, the interference cancelling circuit may include a first switch 706 configured to control the first interference circuit by providing analog feedback to the first interference circuit when the first switch 706 is activated, and a second switch 708 configured to control the second interference circuit by steering the second interference circuit using digital coefficients when the second switch 708 is activated. Operation of the first interference circuit may be disabled when the first switch 706 is deactivated. Operation of the second interference circuit may be disabled when the second switch 708 is deactivated. For example, the first switch 706 may be activated when interference in the fundamental frequency of the RF signal exceeds a predefined threshold power level, and the second switch 708 may be activated when interference in the fundamental frequency of the RF signal does not exceed the predefined threshold power level.

In some instances, the interference cancelling circuit includes a controller adapted to generate digital coefficients from a baseband representation of the RF signal. The digital coefficients may be used to steer one or more filters in the first and/or second interference circuit.

In some instances, the interference cancelling circuit may include a control circuit configured to operate the first switch and the second switch based on an estimation of noise power in the fundamental frequency of the RF signal obtained using a reference signal representative of an interfering signal transmitted by a transmitter coupled to the interference cancelling circuit. For example, the control circuit may be implemented using a processing circuit and/or control logic.

Several aspects of a telecommunications system have been presented. As those skilled in the art will readily appreciate, various aspects described throughout this disclosure may be extended to various types of telecommunication systems, network architectures and communication standards.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the various drawings may be configured to perform one or more of the methods, features, or steps described herein. The novel algorithms described herein may also be efficiently implemented in software and/or embedded in hardware.

It is to be understood that any specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of performing interference cancellation in a wireless communications device having a transmitter and a receiver, the method comprising:

filtering a reference signal representative of an interfering signal transmitted by the transmitter using an adaptive filter to obtain a filtered reference signal;

combining the filtered reference signal with a radio frequency (RF) signal received by the receiver to obtain a combined signal, wherein the RF signal is affected by the interfering signal;

providing first feedback to the adaptive filter when fundamental frequency interference in the RF signal exceeds a predefined threshold power level, wherein the first feedback causes the adaptive filter to target fundamental frequency interference in the RF signal with the filtered reference signal; and providing second feedback to the adaptive filter when the fundamental frequency interference does not exceed the predefined threshold power level, wherein the second feedback causes the adaptive filter to target out-of-band interference affecting the RF signal with the filtered reference signal, wherein the filtered reference signal cancels interference in the RF signal when combined with the RF signal.

2. The method of claim 1, wherein the first feedback comprises an analog signal representative of the combined signal.

3. The method of claim 1, wherein providing the second feedback to the adaptive filter comprises:
computing a filter coefficient for the adaptive filter from a digital signal representative of the combined signal.

4. The method of claim 3, wherein computing the filter coefficient comprises:
computing the filter coefficient from a baseband representation of the combined signal.

5. The method of claim 3, further comprising:
providing the filter coefficient to a digital-to-analog converter to obtain the second feedback.

6. The method of claim 1, and further comprising:
generating in-phase and quadrature signals from the reference signal; and
mixing the in-phase and quadrature signals with signals generated from the first feedback.

7. The method of claim 1, wherein the adaptive filter comprises a least-mean squares filter.

8. The method of claim 1, and further comprising:
closing a first switch when the fundamental frequency interference in the RF signal exceeds the predefined threshold power level; and
closing a second switch when the fundamental frequency interference in the RF signal does not exceed the predefined threshold power level,
wherein each of the first switch and the second switch controls provision of a respective type of feedback to the adaptive filter.

9. The method of claim 8, wherein a first one of the one or more switches selects a source of feedback to a first filter circuit in the adaptive filter.

10. The method of claim 8, wherein digital coefficients control the adaptive filter when a second one of the one or more switches is closed.

11. The method of claim 1, wherein providing the second feedback to the adaptive filter comprises:
providing to the adaptive filter a baseband feedback signal generated from digital coefficients calculated using a baseband representation of the combined signal.

12. The method of claim 1, wherein the adaptive filter comprises a first filter circuit and a second filter circuit, and further comprising:
controlling the first filter circuit using the first feedback;
controlling the second filter circuit using the second feedback; and
combining outputs of the first filter circuit and the second filter circuit to obtain the filtered reference signal.

13. The method of claim 1, further comprising:
receiving a baseband transmission signal from the transmitter; and
cancelling interference in a baseband representation of the RF signal using the baseband transmission signal.

14. The method of claim 13, wherein the baseband transmission signal comprises a digital signal.

15. An interference cancelling circuit that is coupled to a radio frequency (RF) receiver and that comprises:
a first interference circuit configured to cancel interference at a fundamental frequency in an RF signal received by the RF receiver, wherein the first interference circuit is activated when interference in the fundamental frequency of the RF signal exceeds a predefined threshold power level; and
a second interference circuit configured to cancel out-of-band interference associated with the RF signal, wherein the second interference circuit is activated when interference in the fundamental frequency of the RF signal does not exceed a predefined threshold power level,
wherein the first interference circuit and the second interference circuit are responsive to a reference signal representative of an interfering signal transmitted by a nearby transmitter, and
wherein outputs of the first interference circuit and the second interference circuit are combined to provide a signal operable to cancel interference in the RF signal.

16. The interference cancelling circuit of claim 15, further comprising:
a first switch configured to control the first interference circuit by providing analog feedback to the first interference circuit when the first switch is activated, wherein operation of the first interference circuit is disabled when the first switch is deactivated; and
a second switch configured to control the second interference circuit by steering the second interference circuit using digital coefficients when the second switch is activated, wherein operation of the second interference circuit is disabled when the second switch is deactivated.

17. The interference cancelling circuit of claim 16, wherein:
the first switch is activated when interference in the fundamental frequency of the RF signal exceeds a predefined threshold power level; and
the second switch is activated when interference in the fundamental frequency of the RF signal does not exceed the predefined threshold power level.

18. The interference cancelling circuit of claim 16, wherein an analog feedback signal provided by the receiver is provided to the first interference circuit when the first switch is activated.

19. The interference cancelling circuit of claim 16, further comprising:
a controller adapted to generate digital coefficients from a baseband representation of the RF signal, wherein the digital coefficients steer the second interference circuit when the second switch is activated.

20. The interference cancelling circuit of claim 16, further comprising:
a control circuit configured to operate the first switch and the second switch based on an estimation of noise power in the fundamental frequency of the RF signal obtained using a reference signal representative of an interfering signal transmitted by a transmitter coupled to the interference cancelling circuit.

21. The interference cancelling circuit of claim 15, further comprising:
a digital cancellation circuit configured to cancel interference in a baseband signal derived from the RF signal using a digital representation of an interfering signal transmitted by a transmitter coupled to the interference cancelling circuit.

22. The interference cancelling circuit of claim 21, wherein the baseband signal comprises a signal that has been processed by the first interference circuit or the second interference circuit.

23. An interference cancelling circuit that is coupled to a radio frequency (RF) receiver and comprises:
a first interference circuit configured to cancel interference at a fundamental frequency in an RF signal received by the RF receiver using analog feedback; and a second interference circuit configured to cancel out-of-band interference associated with the RF signal using digital feedback, wherein the first interference circuit and the second interference circuit are responsive to one or more reference signals representative of an interfering signal transmitted by a nearby transmitter, and wherein outputs of the first interference circuit and the second interference circuit are combined to provide a signal configured to cancel interference in the RF signal.

24. The interference cancelling circuit of claim 23, wherein the analog feedback comprises a feedback signal provided by the receiver.

25. The interference cancelling circuit of claim 23, further comprising:

a controller adapted to generate first digital coefficients and second digital coefficients from a baseband representation of the RF signal, wherein the first digital coefficients steer a filter in the first interference circuit, and wherein the second digital coefficients steer a filter in the second interference circuit.

26. The interference cancelling circuit of claim 23, further comprising:

a control circuit configured to control the first interference circuit or the second interference circuit based on an estimation of noise power in the fundamental frequency of the RF signal obtained and the one or more reference signals representative of the interfering signal transmitted by a transmitter coupled to the interference cancelling circuit.

27. The interference cancelling circuit of claim 23, further comprising:

a digital cancellation circuit configured to cancel interference in a baseband signal derived from the RF signal using a baseband digital signal representative of an interfering signal transmitted by a transmitter coupled to the interference cancelling circuit.

28. The interference cancelling circuit of claim 23, further comprising:

a first switch configured to control the first interference circuit by providing the analog feedback to the first interference circuit when the first switch is activated, wherein operation of the first interference circuit is disabled when the first switch is deactivated; and a second switch configured to control the second interference circuit, wherein the second interference circuit is steered using digital coefficients generated from a baseband signal derived from the RF signal when the second switch is activated, and wherein operation of the second interference circuit is disabled when the second switch is deactivated.

29. The interference cancelling circuit of claim 28, further comprising:

a control circuit configured to operate the first switch and the second switch based on an estimation of noise power in the fundamental frequency of the RF signal obtained using a reference signal representative of an interfering signal transmitted by a transmitter coupled to the interference cancelling circuit.

* * * * *